(12) United States Patent
Lee

(10) Patent No.: US 12,704,700 B2
(45) Date of Patent: Aug. 11, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventor: Hwanseon Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 535 days.

(21) Appl. No.: 17/947,285

(22) Filed: Sep. 19, 2022

(65) Prior Publication Data

US 2023/0152558 A1 May 18, 2023

Related U.S. Application Data

(63) Continuation of application No. PCT/KR2022/013451, filed on Sep. 7, 2022.

(30) Foreign Application Priority Data

Nov. 12, 2021 (KR) ........................ 10-2021-0155350

(51) Int. Cl.
*G02B 15/14* (2006.01)
*G02B 9/12* (2006.01)
*G02B 13/00* (2006.01)

(52) U.S. Cl.
CPC ....... *G02B 15/143503* (2019.08); *G02B 9/12* (2013.01); *G02B 13/0045* (2013.01); *G02B 13/0065* (2013.01); *G02B 13/009* (2013.01)

(58) Field of Classification Search
CPC .... G02B 15/143503; G02B 15/144105; G02B 15/144503; G02B 15/144505;
(Continued)

(56) References Cited

U.S. PATENT DOCUMENTS 4,303,311 A * 12/1981 Nakamura ..... G02B 15/143503 359/689
5,264,965 A 11/1993 Hirakawa
(Continued)

FOREIGN PATENT DOCUMENTS

CN 111505807 A 8/2020
CN 112444948 A 3/2021
(Continued)

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*
(Continued)

*Primary Examiner* — Cara E Rakowski
(74) *Attorney, Agent, or Firm* — Sughrue Mion, PLLC

(57) ABSTRACT

According to certain embodiments, an electronic device comprises, a processor; and a lens assembly, wherein the lens assembly includes, an image sensor; and a first lens group, a second lens group, and a third lens group; wherein the first lens group has a negative refractive power and includes at least two lenses; wherein the second lens group has a positive refractive power and is configured to move along an optical axis direction between the first lens group and the image sensor, the second lens group including at least two lenses; and wherein the third lens group has a negative refractive power and is configured to move back and forth along the optical axis direction between the second lens group and the image sensor, the third lens group including at least one lens, wherein the processor is configured to increase a focal length of the lens assembly by moving at least one of the second lens group and the third lens group toward an object side in a zooming operation.

14 Claims, 31 Drawing Sheets

(58) Field of Classification Search
CPC .... G02B 15/144507; G02B 15/144511; G02B 13/0065
See application file for complete search history.

(56) References Cited

U.S. PATENT DOCUMENTS

| | | | | |
|---|---|---|---|---|
| 5,731,911 | A * | 3/1998 | Kagoshima | G02B 15/143503 359/689 |
| 10,185,131 | B2 | 1/2019 | Fujikura et al. | |
| 10,908,387 | B2 | 2/2021 | Lee | |
| 2007/0146897 | A1* | 6/2007 | Hozumi | G02B 15/143503 359/680 |
| 2009/0237806 | A1 | 9/2009 | Ito | |
| 2010/0033834 | A1* | 2/2010 | Matsusaka | G02B 15/177 359/682 |
| 2012/0127590 | A1* | 5/2012 | Muratani | G02B 13/26 359/689 |
| 2014/0300781 | A1 | 10/2014 | Yamasaki | |
| 2015/0131164 | A1 | 5/2015 | Wakazono et al. | |
| 2016/0147050 | A1* | 5/2016 | Fujikura | H04N 23/663 359/689 |
| 2017/0052353 | A1 | 2/2017 | Yamasaki | |
| 2017/0108677 | A1 | 4/2017 | Shimomura et al. | |
| 2017/0187962 | A1* | 6/2017 | Lee | G02B 27/646 |
| 2017/0212337 | A1 | 7/2017 | Lee et al. | |
| 2018/0129025 | A1 | 5/2018 | Kuwashiro | |
| 2019/0056572 | A1* | 2/2019 | Takada | H04N 23/69 |
| 2019/0086638 | A1 | 3/2019 | Lee | |
| 2021/0063702 | A1 | 3/2021 | Kim et al. | |
| 2021/0333527 | A1 | 10/2021 | Kim et al. | |
| 2022/0269048 | A1* | 8/2022 | Lee | G02B 13/0065 |

FOREIGN PATENT DOCUMENTS

| | | | |
|---|---|---|---|
| CN | 112731636 | A | 4/2021 |
| EP | 3 327 480 | B1 | 7/2020 |
| JP | 2015-94866 | A | 5/2015 |
| JP | 2015-94867 | A | 5/2015 |
| JP | 2017-78770 | A | 4/2017 |
| KR | 10-2018-0037170 | A | 4/2018 |
| KR | 10-2019-0032905 | A | 3/2019 |
| KR | 10-2019-0121678 | A | 10/2019 |

OTHER PUBLICATIONS

Extended European Search Report dated Oct. 29, 2024.
International Search Report dated Dec. 14, 2022.
Communication dated May 6, 2026 issued by the Korean Ministry of Intellectual Property in Korean Patent Application No. 10-2021-0155350.

* cited by examiner

500
S2
S4
S7
S9
S11
S13
img
obj
S15
O
S17
457
511
512
521
522
523
531
532
451
G1
G2
G3

LENS ASSEMBLY AND ELECTRONIC DEVICE INCLUDING THE SAME

CROSS-REFERENCE TO RELATED APPLICATIONS

This application is a continuation of International Application No. PCT/KR2022/013451 designating the United States, filed on Sep. 7, 2022, in the Korean Intellectual Property Receiving Office and claiming priority to Korean Patent Application No. 10-2021-0155350, filed on Nov. 12, 2021, in the Korean Intellectual Property Office, the disclosures of all of which are incorporated by reference herein in their entireties.

BACKGROUND

Technical Field

Certain embodiments of the disclosure relate to an electronic device, e.g., a lens assembly and an electronic device including the same.

Description of Related Art

Lens assemblies, for example, cameras capable of capturing images or videos have been widely used, and digital cameras or video cameras with solid image sensors such as charge coupled device (CCD) or complementary metal-oxide semiconductor (CMOS) have recently become commonplace. Solid image sensor (CCD or CMOS)-adopted lens assemblies may easily save, copy, or move, between electronic devices, images as compared with film-type lens assemblies and have thus been replacing film-type lens assemblies.

A plurality of lens assemblies, e.g., two or more selected from a macro camera, a telephoto camera, and/or a wide-angle camera, can be built in one electronic device to enhance the quality of captured images and give various visual effects to captured images. For example, multiple cameras can be used to obtain images of an object. The multiple cameras can have different optical properties. The images from the multiple cameras can be synthesized to obtain a high-quality captured image.

The electronic device, made lighter and/or more compact for everyday carrying and use, may encounter difficulty in enhancing the performance of the camera or lens assembly. For example, although image quality is enhanced by combining a plurality of lens assemblies, it is still hard to pack the compact and/or lightweight electronic device with the telephoto or zoom function due to its small space.

Certain embodiments of the disclosure aim to address the foregoing issues and/or drawbacks and provide advantages described below, providing a lens assembly, which has a reduced size while implementing the zoom function, and/or an electronic device including the same.

Other aspects according to certain embodiments will be suggested through in the following detailed description and would be partially apparent from the description or appreciated through the suggested embodiments.

The above-described information may be provided as background for the purpose of helping understanding of the disclosure. No claim or determination is made as to whether any of the foregoing is applicable as background art in relation to the disclosure.

SUMMARY

According to certain embodiments, a lens assembly comprises, an image sensor; a first lens group; a second lens group; and a third lens group, wherein the first lens group has a negative refractive power, is disposed along an optical axis direction from the image sensor, and comprises at least two lenses; wherein the second lens group has a positive refractive power and is configured to move along the optical axis direction between the first lens group and the image sensor, the second lens group comprising at least two lenses; wherein the third lens group has a negative refractive power and is configured to move back and forth along the optical axis direction between the second lens group and the image sensor, the third lens group comprising at least one lens, wherein the lens assembly is configured to perform zooming, and wherein during zooming, as at least one of the second lens group and the third lens group moves toward an object side, a focal length of the lens assembly increases, and wherein the lens assembly meets conditional equation 1 and conditional equation 2, wherein $$-1.7 \leq fG11/fG1 \leq -0.6 \quad \text{[conditional equation 1]}$$

$$-3.2 \leq \beta G3t/\beta G2t \leq -2 \quad \text{[conditional equation 2]}$$

wherein 'fG11' is a focal length of a first lens on the object side among lenses of the first lens group, 'fG1' is a focal length of the first lens group, 'βG3t' is an imaging magnification of the third lens group at a telephoto end, and 'βG2t' is an imaging magnification of the second lens group at the telephoto end.

According to certain embodiments, an electronic device comprises, a processor; and a lens assembly, wherein the lens assembly includes, an image sensor; and a first lens group, a second lens group, and a third lens group; wherein the first lens group has a negative refractive power and includes at least two lenses; wherein the second lens group has a positive refractive power and is configured to move along an optical axis direction between the first lens group and the image sensor, the second lens group including at least two lenses; and wherein the third lens group has a negative refractive power and is configured to move back and forth along the optical axis direction between the second lens group and the image sensor, the third lens group including at least one lens, wherein the processor is configured to increase a focal length of the lens assembly by moving at least one of the second lens group and the third lens group toward an object side in a zooming operation.

BRIEF DESCRIPTION OF THE DRAWINGS

The foregoing and other aspects, configurations, and/or advantages of certain embodiments of the disclosure will be more apparent from the following detailed description taken in conjunction with the accompanying drawings.

Throughout the drawings, like reference numerals may be assigned to like parts, components, and/or structures.

DETAILED DESCRIPTION

According to certain embodiments of the disclosure, the lens assembly implements a zoom function using the second lens group or the third lens group while allowing the object-side first lens group to remain in a static state, rendering it easy to make it smaller. For example, the lens assembly may easily be equipped in a small and/or light-weight electronic device and contribute to expanding the optical functionality or enhancing the optical performance of the electronic device.

The following description taken in conjunction with the accompanying drawings may be presented to provide a comprehensive understanding of various implementations of the disclosure as defined by the claims and equivalents thereto. The specific embodiments disclosed in the following description entail various specific details to aid understanding, but are regarded as one of certain embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the certain embodiments of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

Figure 1:
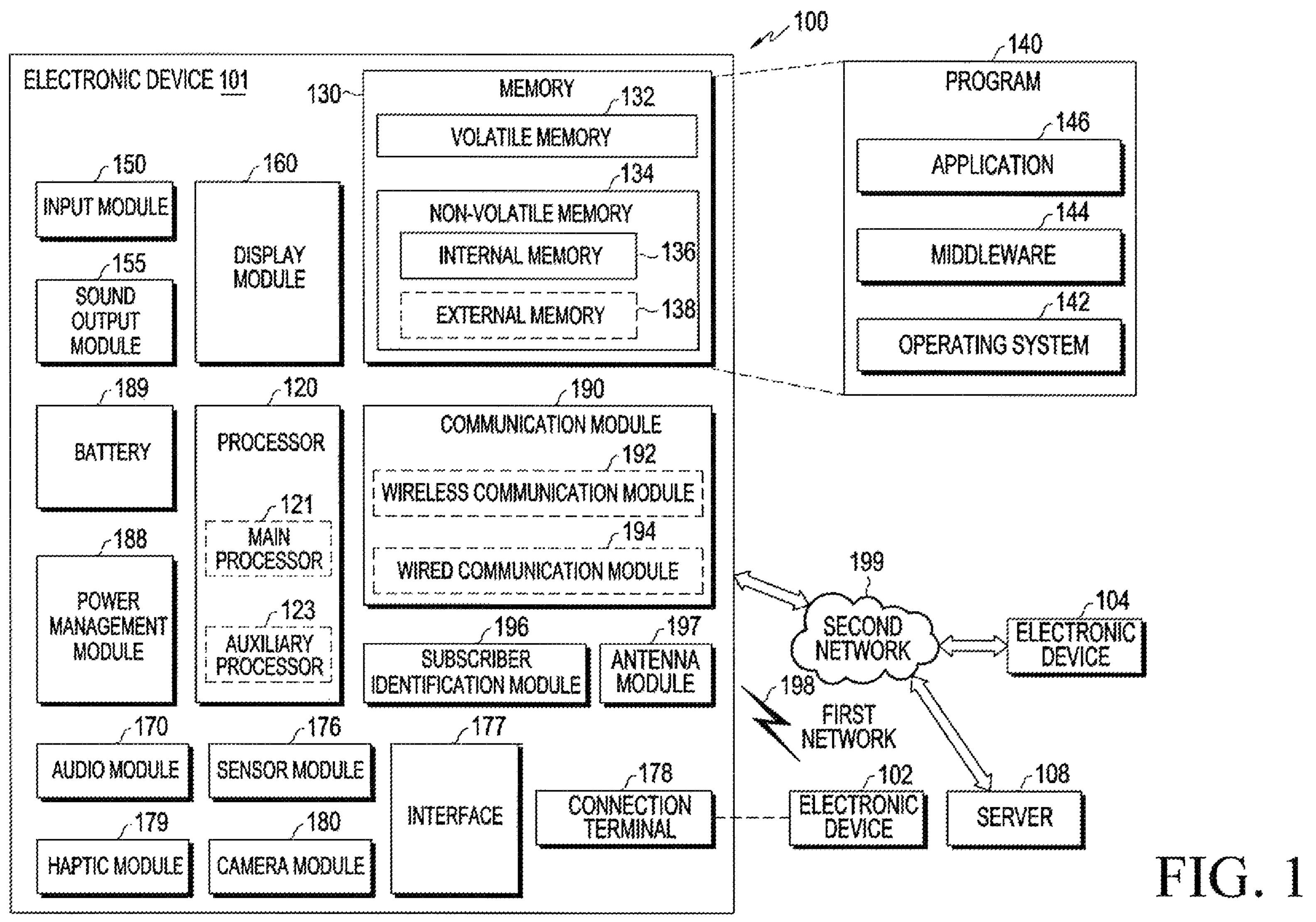
FIG. 1 is a block diagram illustrating an electronic device in a network environment according to certain embodiments of the disclosure.

FIG. 1 describes an electronic device that can be equipped with a camera module that includes a plurality of lens assemblies, allowing for the simultaneous capturing of multiple images.

FIG. 1 is a block diagram illustrating an electronic device 101 in a network environment 100 according to certain embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. The display 160 may include a touch sensor configured to detect a touch, or a pressure sensor configured to measure the intensity of a force generated by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The antenna module 197 may transmit or receive a signal or power to or from the outside (e.g., the external electronic device). The antenna module may include an antenna including a radiator formed of a conductor or conductive pattern formed on a substrate (e.g., a printed circuit board (PCB)). The antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to certain embodiments may be one of various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

In the following detailed description, a length direction, a width direction, and/or a thickness direction of the electronic device may be mentioned and may be defined as a 'Y-axis direction,' 'X-axis direction', and/or 'Z-axis direction,' respectively. In some embodiments, 'negative/positive (−/+)' may be mentioned together with the Cartesian coordinate system exemplified in the drawings with respect to the direction in which the component is oriented. For example, the front surface of the electronic device or housing may be defined as a 'surface facing in the +Z direction,' and the rear surface may be defined as a 'surface facing in the −Z direction'. In some embodiments, the side surface of the electronic device or housing may include an area facing in the +X direction, an area facing in the +Y direction, an area facing in the −X direction, and/or an area facing in the −Y direction. In another embodiment, the 'X-axis direction' may mean including both the '−X direction' and the '+X direction'. It should be noted that the directions are so defined with respect to the Cartesian coordinate system shown in the drawings for the sake of brevity of description, and the description of these directions or components do not limit certain embodiments of the disclosure.

The camera module 180 can include combinations of lens assemblies and charged coupled devices (CCDs) that operate as cameras. The lens assemblies focus the light from an external scene from the electronic device. The CCDs capture the image into a digital form. Moreover, the electronic device 101 can include multiple cameras implemented by multiple lens assemblies. Each of the lens assemblies can be used to capture an image with different magnifications, vantage points, and other properties. The processor 120 can then synthesize the image to generate a higher quality image.

Figure 2:
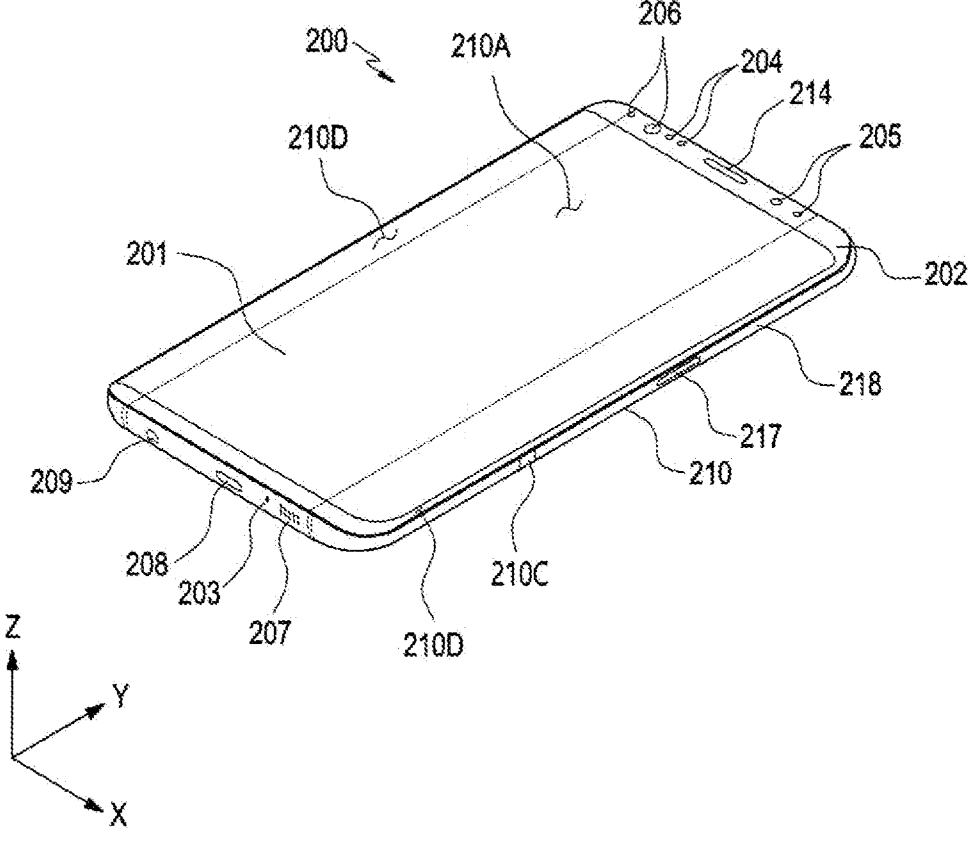
FIG. 2 is a front perspective view illustrating an electronic device according to certain embodiments of the disclosure.
Figure 3:
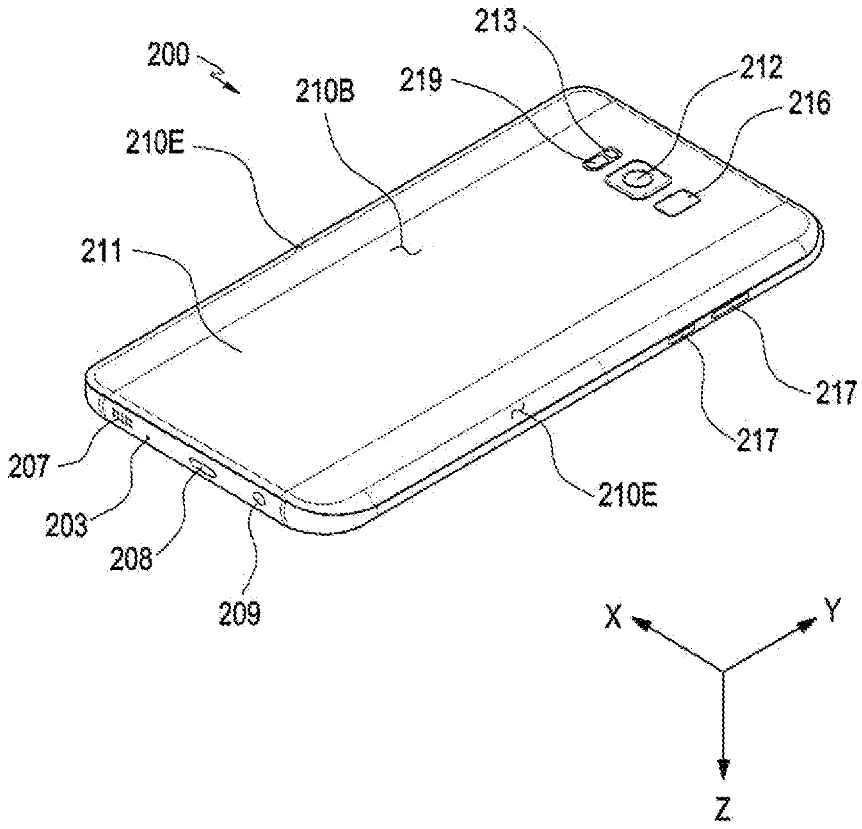
FIG. 3 is a rear perspective view illustrating the electronic device of FIG. 2.
Figure 4:
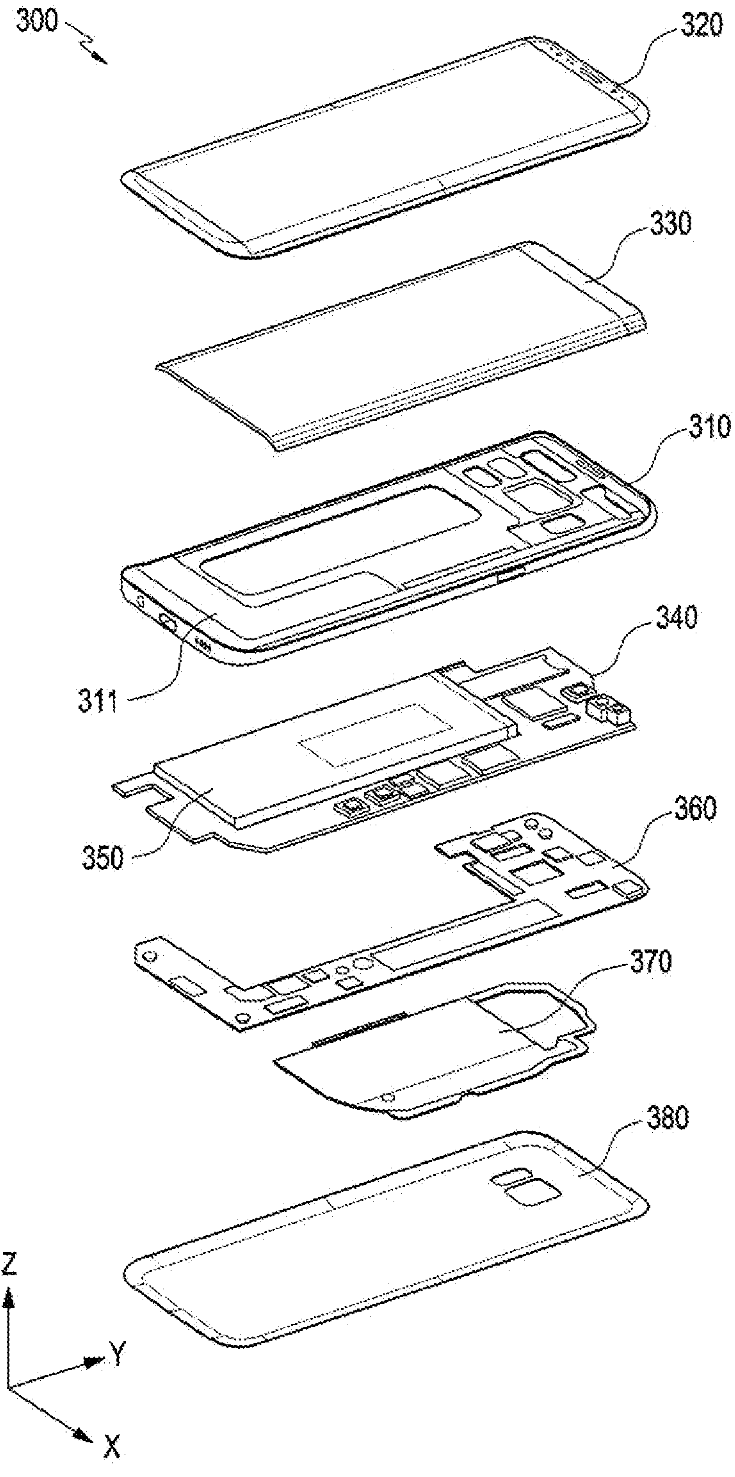
FIG. 4 is an exploded perspective view illustrating the electronic device of FIG. 2.

FIGS. 2-4 describe the housing of the electronic device, and the mounting of the camera module 180 in the housing.

FIG. 2 is a front perspective view illustrating an electronic device 200 according to certain embodiments of the disclosure. FIG. 3 is a rear perspective view illustrating the electronic device 200 of FIG. 2.

Electronic device can include smartphones. Smartphones are generally thin and rectangular shaped. One surface of rectangle shape, the front surface 210A can be primarily consumed by a display 201. Additionally, the front surface 210A can expose at least one front facing camera module 205 (also known as a selfie-camera). A rear surface 210B of the rectangular shape can expose a rear facing camera modules 212, 213.

Referring to FIGS. 2 and 3, an electronic device 200 may include a housing 210 including a first surface (or front surface) 210A, a second surface (or rear surface) 210B, and a side surface 210C surrounding a space between the first surface 210A and the second surface 210B. The housing may denote a structure forming part of the first surface 210A, the second surface 210B, and the side surface 210C of FIG. 2. At least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side structure 218 that couples to the front plate 202 and the rear plate 211 and includes a metal and/or polymer. The rear plate 211 and the side structure 218 may be integrally formed together and include the same material (e.g., a metal, such as aluminum).

In the embodiment illustrated, the front plate 202 may include two first areas 110D, which seamlessly and bendingly extend from the first surface 210A to the rear plate 211, on both the long edges of the front plate 202. In the embodiment (refer to FIG. 3) illustrated, the rear plate 211 may include second areas 210E, which seamlessly and bendingly extend from the second surface 210B to the front plate 202, on both the long edges. The front plate 202 (or the rear plate 211) may include only one of the first areas 210D (or the second areas 210E). Alternatively, the first areas 210D or the second areas 210E may partially be excluded. At side view of the electronic device 200, the side structure 218 may have a first thickness (or width) for sides that do not have the first areas 210D or the second areas 210E and a second thickness, which is smaller than the first thickness, for sides that have the first areas 210D or the second areas 210E.

The electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. The electronic device 200 may exclude at least one (e.g., the key input device 217 or the light emitting device 206) of the components or may add other components.

The display 201 may be exposed through a significant portion of the front plate 202. At least a portion of the display 201 may be exposed through the front plate 202 forming the first surface 210A and the first areas 210D of the side surface 210C. The edge of the display 201 may be formed to be substantially the same in shape as an adjacent outer edge of the front plate 202. According to another embodiment (not shown), the interval between the outer edge of the display 201 and the outer edge of the front plate 202 may remain substantially even to give a larger area of exposure the display 201.

The screen display area of the display 201 may have a recess or opening in a portion thereof, and at least one or more of the audio module 214, sensor module 204, camera module 205, and light emitting device 206 may be aligned with the recess or opening. According to another embodiment (not shown), at least one or more of the audio module 214, sensor module 204, camera module 205, fingerprint sensor 216, and light emitting device 206 may be included on the rear surface of the screen display area of the display 201. The display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first areas 210D and/or the second areas 210E.

The audio modules 203, 207, and 214 may include a microphone hole 203 and speaker holes 207 and 214. The microphone hole 203 may have a microphone inside to obtain external sounds. There may be a plurality of microphones to be able to detect the direction of a sound. The speaker holes 207 and 214 may include an external speaker hole 207 and a phone receiver hole 214. The speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210B as well as the first surface 210A (e.g., the display 201) of the housing 210. The electronic device 200 may further include the sensor module of FIG. 1, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or a flash 213 disposed on the second surface 210B. The camera devices 205 and 212 may include one or more lenses, an image sensor, and/or an image signal processor. The flash 213 may include, e.g., a light emitting diode (LED) or a xenon lamp. Two or more lenses (an infrared (IR) camera, a wide-angle lens, and a telephoto lens) and image sensors may be disposed on one surface of the electronic device 200.

The key input device 217 may be disposed on the side surface 210C of the housing 210. According to another embodiment, the electronic device 200 may exclude all or some of the above-mentioned key input devices 217 and the excluded key input devices 217 may be implemented in other forms, e.g., as soft keys, on the display 201. The key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. The light emitting device 206 may provide a light source that interacts with, e.g., the camera module 205. The light emitting device 206 may include, e.g., a light emitting diode (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

FIG. 4 is an exploded perspective view illustrating the electronic device 300 (e.g., the electronic devices 101 to 200 of FIGS. 1 to 3) of FIG. 2.

Referring to FIG. 4, an electronic device 300 (e.g., the electronic devices 101 and 200 of FIGS. 1 to 3) may include a side structure 310 (e.g., the side surface 210C of FIG. 2), a first supporting member 311 (e.g., a bracket), a front plate 320, a display 330 (e.g., the display module 160 of FIG. 1 or the display 201 of FIG. 2), a printed circuit board 340, a battery 350, a second supporting member 360 (e.g., a rear case), an antenna 370, and/or a rear plate 380. The electronic device 300 may exclude at least one (e.g., the first supporting member 311 or the second supporting member 360) of the components or may add other components. At least one of the components of the electronic device 300 may be the same or similar to at least one of the components of the electronic device 200 of FIG. 2 or 3 and no duplicate description is made below.

The first supporting member 311 may be disposed inside the electronic device 300 to be connected with the side surface structure 310 or integrated with the side surface structure 310. The first supporting member 311 may be formed of, e.g., a metallic material and/or non-metallic material (e.g., polymer). The display 330 may be joined onto one surface of the first supporting member 311, and the printed circuit board 340 may be joined onto the opposite surface of the first supporting member 232. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 450 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the present invention, an antenna structure may be formed by a portion or combination of the side structure 310 and/or the first supporting member 311.

It should be noted that in the following detailed description, reference may be made to the electronic devices 101, 200, and 300 of the foregoing embodiments, and components, which may easily be understood through the foregoing embodiments, are assigned the same reference numerals or omitted and a description thereof may be omitted.

Figure 5:
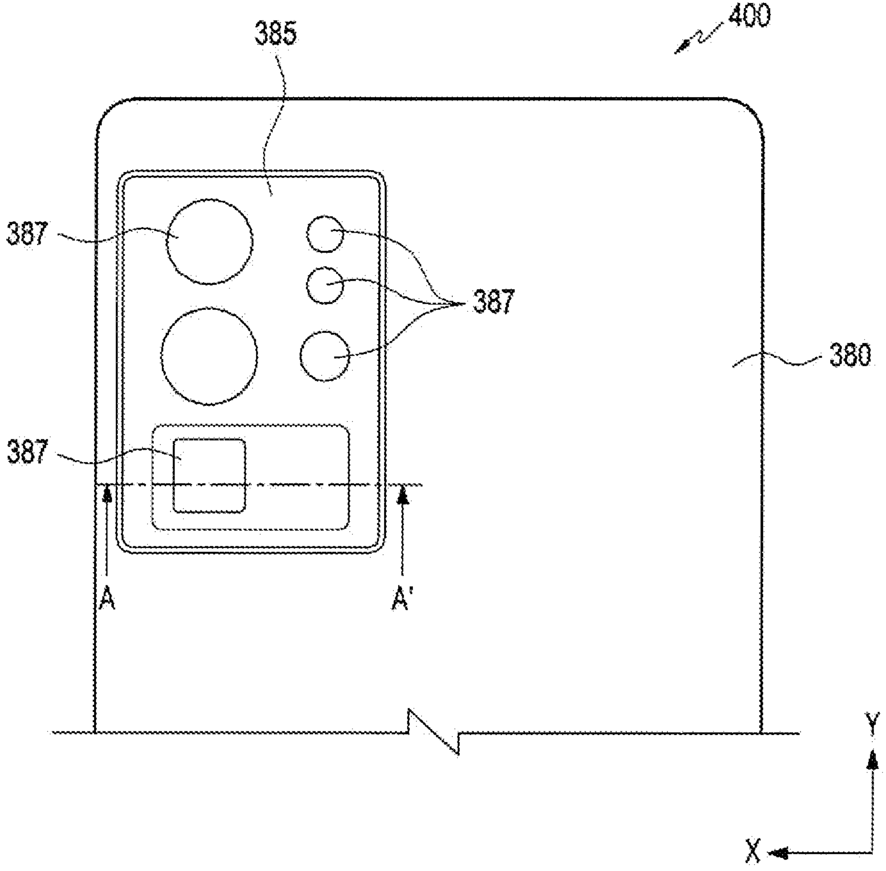
FIG. 5 is a rear plan view illustrating an electronic device according to certain embodiments of the disclosure.
Figure 6:
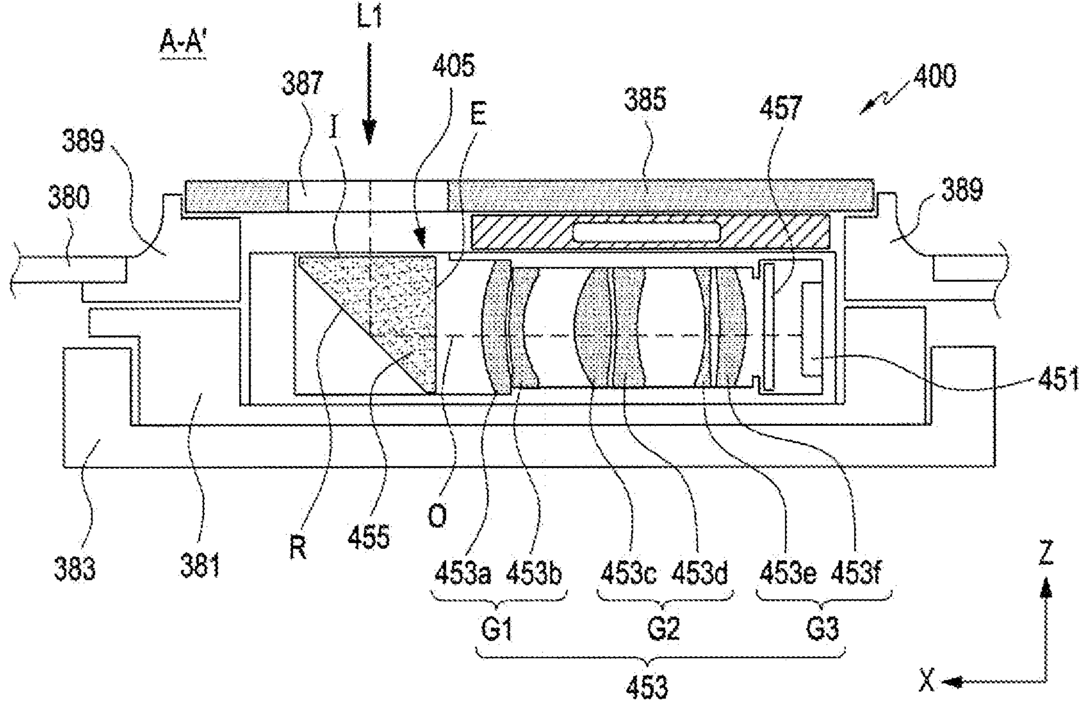
FIG. 6 is a cross-sectional view illustrating a portion of an electronic device, taken along line A-A' of FIG. 5.

FIG. 5 is a rear plan view illustrating a rear surface of an electronic device 400 (e.g., the electronic devices 101, 200, and 300 of FIGS. 1 to 4) according to certain embodiments of the disclosure. FIG. 6 is a cross-sectional view illustrating a portion of the electronic device 400, taken along line A-A' of FIG. 5.

The electronic device 400 includes camera module 405 that are exposed through transparent areas 387 in camera window 385. Moreover, one of the camera modules 405 can be a folded camera as shown in FIG. 6. In the folded camera, light L1 is incident orthogonally to the surface of the electronic device. A reflective member 455 reflects the light L1 in a direction along an optical axis O that is substantially parallel and between the front and rear surface of the electronic device through lenses *453a* . . . *453f*. It is noted that the optical axis is not in the direction of the thickness of the electronic device, thereby allowing more room for the lenses.

Referring to FIGS. 5 and 6, the electronic device 400 may include a camera window 385 disposed on one surface (e.g., the second surface 210B of FIG. 3). In some embodiments, the camera window 385 may be a portion of the rear plate 380. In an embodiment, the camera window 385 may be coupled to the rear plate 380 through a ring 389. When it is viewed from the outside, the ring 389 may be exposed in a form surrounding the camera window 385. The camera window 385 may include a plurality of transparent areas 387. The electronic device 400 may receive external light or emit light to the outside through at least one of the transparent areas. For example, the electronic device 400 may include at least one camera module 405 (e.g., the camera modules 180, 205, 212, and 213 of FIGS. 1 to 3) disposed to correspond to at least some of the transparent areas 387 and at least one light source (e.g., an infrared light source) disposed to correspond to others of the transparent areas 387. For example, the camera module or the light source may receive external light or emit light to the outside of the electronic device 400 through any one of the transparent areas 387.

The electronic device 400 may include at least one of a camera module 405 or a light receiving element (e.g., a lens assembly such as a wide-angle camera, an ultra-wide-angle camera, a macro camera and a telephoto camera, or an infrared photodiode), and may include a flash (e.g., the flash 213 of FIG. 3) or an infrared laser diode as a light source or light emitting element. In an embodiment, the electronic device 400 may emit an infrared laser to the subject to detect the distance or depth. In another embodiment, the electronic device 400 may obtain an image of the subject by the lens assembly, e.g., by any one or a combination of two or more of the camera modules 405 and, as needed, provide illumination toward the subject by means of a flash.

The camera modules can include a wide-angle camera, an ultra-wide-angle camera, or a macro camera. The macro camera may have a smaller length in the optical axis (O) direction of the lens(es) as compared to the telephoto camera (e.g., the camera module 405). For example, the telephoto camera (e.g., the camera module 405) having a relatively large focal length adjustment range may secure a sufficient length or space in the optical axis O direction and thus a distance and area where the lens(es) 453 (s) may move. In an embodiment, in the wide-angle camera, the ultra-wide-angle camera, or the macro camera, although the lens(es) are arranged along the thickness (e.g., the thickness measured in the Z-axis direction of FIG. 4 or 6) of the electronic device 400, the substantial influence on the thickness of the electronic device 400 may be small. For example, the wide-angle camera, the ultra-wide-angle camera, or the macro camera may be disposed in the electronic device 400 such that light is incident from the outside to the electronic device 400 and the optical axis direction of the lens(es) are substantially the same. In another embodiment, as compared with the wide-angle camera, the ultra-wide-angle camera, or the macro camera, the camera module 405 (e.g., a telephoto camera) has a small angle of view but may be useful for capturing a subject at a greater distance and may include more lens(es) 453 or a longer moving distance of the lens(es) 453 in focal length adjustment. For example, when the lens(es) 453 of the camera module 405 are arranged in the thickness direction (e.g., the Z-axis direction) of the electronic device 400, the thickness of the electronic device 400 may increase or a significant portion of the camera module 405 may protrude to the outside of the electronic device 400.

A folded camera (e.g., the camera module 405) further may include a reflective member 455, such as a prism, so that the direction (e.g., the optical axis O direction of FIG. 6) in which the lens(es) 453 are arranged, may be configured to cross the direction in which external light is incident (e.g., the incident direction L1 of FIG. 6). For example, the reflective member 455 may refract or reflect the light incident from the outside to change the propagation direction of the light and guide the light to the image sensor 451 or in the direction in which the lens(es) 453 are arranged.

The reflective member 455 may include an incident surface I, an exit surface, and a reflective surface. The incident surface I faces the external space. The exit surface E faces the lens 453. The reflective surface R is inclined with respect to the incident surface I (or exit surface E). For example, external light may be incident through the incident surface I and be reflected by the reflective surface R, and the reflected light may pass through the exit surface E to the lens 453 or the image sensor 451. Depending on the shape or size, the electronic device 400 may not include the reflective member 455, and when it does not include the reflective member 455, the incident direction L1 may be substantially parallel to or coincident with the optical axis O direction.

The incident direction L1 may be substantially parallel to the thickness direction (e.g., the Z-axis direction) of the electronic device 400. The arrangement direction of the lens(es) 453 may be a direction in which the light refracted or reflected by the reflective member 455 travels and crosses the incident direction L1. In some embodiments, the arrangement direction or the optical axis O direction of the lens(es) 453 may be substantially perpendicular to the incident direction L1, and be parallel to the width direction (e.g., the X-axis direction of FIG. 4) or the length direction (e.g., the Y-axis direction of FIG. 4) of the electronic device 400 or the housing (e.g., the housing 210 of FIG. 2).

The lens assembly or camera module 405 illustrated in FIG. 6 is an example of a folded camera or a telephoto camera and may be disposed so that the lens(es) 453 may move back and forth in the width direction (e.g., a direction parallel to the X axis, or the optical axis O direction) of the electronic device 400. The camera module 405 may include a reflective member 455 that receives and refracts or reflects external light, a lens(es) 453 that focuses the light refracted or reflected by the reflective member 455, and/or an image sensor 451 aligned on the optical axis O of lens(es) 453. For example, the image sensor 451 may receive external light through the reflective member 455 and the lens(es) 453. In some embodiments, external light may be incident on the reflective member 455 along the incident direction L1, and be reflected or refracted by the reflective member 455 and be guided through the lens(es) 453 to the image sensor 451 along the optical axis O direction.

The reflective member 455 may include, e.g., a prism, and may reflect or refract the light, incident in the incident direction L1, in a direction perpendicular to the incident direction L1 (e.g., the optical axis O direction). Although the configuration in which the incident direction L1 and the optical axis O direction are perpendicular to each other is shown in the present embodiment, certain embodiments of the disclosure are not limited thereto. Depending on the structure of the electronic device 400 or the housing (e.g., the housing 210 of FIG. 2), the angle between the incident direction L1 and the optical axis O direction crossing effective area may vary.

Figures 7, 8:
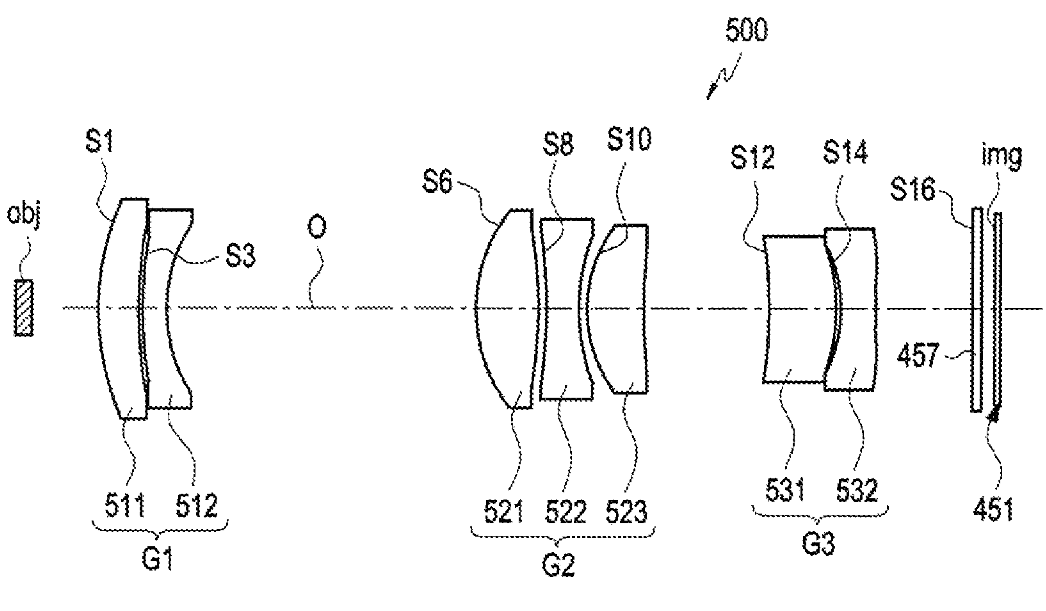
FIG. 7 is a view illustrating a configuration of a lens assembly according to certain embodiments of the disclosure, in which an arrangement of lenses (group) at a wide-angle end is shown.
FIG. 8 is a view illustrating the configuration of the lens assembly of FIG. 7, in which an arrangement of lenses (group) at a telephoto end is shown.

The camera module 405 may include a plurality of lenses 453 sequentially arranged along the optical axis O direction from the side of the object (e.g., the object obj of FIG. 7). In the following detailed description, the plurality of lenses 453 may be distinguished by adding lowercase letters to the reference numbers as necessary. In an embodiment, the incident direction L1 may be parallel to the thickness direction (e.g., the Z-axis direction) of the electronic device 400. The optical axis (O) direction may be parallel to the width direction (e.g., the X-axis direction) or the length direction (e.g., the Y-axis direction) of the electronic device.

In FIG. 6, the camera module 405 may include six lenses 453, and at least one lens 453 sequentially selected from the object side may form a first lens group G1, a second lens group G2, and/or a third lens group G3. In certain embodiments, the number of lenses 453 or the number of lenses 453 included in each lens group G1, G2, and G3 may be different from that in the illustrated embodiment, which will be further discussed with reference to the embodiments of FIGS. 7 to 26C. In the illustrated embodiment, the first lens group G1 may include a first lens 453*a* and a second lens 453*b*, the second lens group G2 may include a third lens 453*c* and a fourth lens 453*d*, and/or the third lens group G3 may include a fifth lens 453*e* and a sixth lens 453*f*.

The lens(es) 453 may be formed of or comprises a synthetic resin so as to have a high design freedom in size or shape. The lens(es) 453 formed of the synthetic resin may have deviations in resolution depending on changes in temperature or humidity. The deviation in resolution in the lens assembly or camera module 405 having a large focal length may be larger than that of a standard camera or a wide-angle camera. According to certain embodiments, when the camera module 405 implements the telephoto function, at least one of the lenses 453 of the first lens group G1 and/or at least one of the lenses of the second lens group G2 may be formed of a glass material and prevent the deviation in resolution that may occur with resin.

At least one of the lens groups G1, G2, and G3 may move forward and backward along the optical axis O direction between the image sensor 451 and the reflective member 455. For example, at least one of the lens groups G1, G2, and G3 may perform a zoom function or focusing operation for adjusting the focal length. In an embodiment, when the first lens 453*a* or the first lens group G1 disposed first from the object side is visually exposed to the external space, the first lens group G1 may remain in a static state. The electronic device 400 or the processor 120 of FIG. 1 may performs focal length adjustment or focus adjustment using the second lens group G2 and/or the third lens group G3. For example, the electronic device 400 or the processor 120 of FIG. 1 may adjust the focal length by moving the second lens group G2 forward and backward in the optical axis O direction or perform focus adjustment by moving the third lens group G3 forward and backward in the optical axis O direction.

The first lens group G1 among the lens groups G1, G2, and G3 may be disposed first from the object side, and may include at least two lenses 453*a* and 453*b* to have a negative refractive power (negative power). When the first lens 453*a* has positive refractive power, the size of the total luminous flux is reduced. This makes it easier to downsize or miniaturize the lens assembly or camera module 405. The second lens 453*b* of the first lens group G1 may be disposed between the first lens 453*a* and the image sensor 451, and may also have negative refractive power. The first lens group G1 may further include at least one lens having positive or negative refractive power.

The second lens group G2 may include at least two lenses 453*c* and 453*d*. The second lens group G2 can have positive power and be configured to move forward and backward along the optical axis O direction between the first lens group G1 and the image sensor 451. For example, the second lens group G2 may adjust the focal length or perform focus adjustment by moving forward and backward along the optical axis O direction. The second lens group G2 may include at least one lens having a positive refractive power and at least one lens having a negative refractive power. In certain embodiments, when the second lens group G2 moves toward the object with respect to the first lens group G1 or the image sensor 451, the focal length of the lens assembly or camera module 405 may be increased. In another embodiment, when the second lens group G2 moves toward the image sensor 451 with respect to the first lens group G1 or the image sensor 451, the focal length of the lens assembly or camera module 405 may be reduced, and the field of view (FOV) may be increased.

The third lens group G3 among the lens groups G1, G2, and G3 may include two lenses 453*e* and 453*f* and have negative refractive power and be arranged to move forward and backward along the optical axis O direction between the second lens group G2 and the image sensor 451. For example, the third lens group G3 may perform focus adjustment or adjust the focal length by moving forward and backward along the optical axis O direction. The third lens group G3 may include one lens having a positive refractive power and one lens having a negative refractive power.

The lens assembly or camera module 405 may further include an infrared cut filter 457 disposed between the third lens group G3 and the image sensor 451. Infrared rays are practically indistinguishable with the naked eye, but may be detected by a photosensitive film or image sensor 451. The infrared cut filter 457 blocks the infrared rays incident on the image sensor 451, thereby reducing or preventing degradation of the quality of the captured image.

The electronic device 400 may include a first camera supporting member 381 or a second camera supporting member 383. The first camera supporting member 381 or the second camera supporting member 383 may place or fix at least one of the camera module 405 and/or another camera module adjacent to the camera module 405 (e.g., a wide-angle camera, an ultra-wide-angle camera, or a macro camera) to the inside of the rear plate 380 or the camera window 385. In some embodiments, the first camera supporting member 381 or the second camera supporting member 383 may be substantially a portion of a first supporting member (e.g., the second supporting member 360 of FIG. 4) or a second supporting member (e.g., the first supporting member 311 of FIG. 4).

Although reference numerals and detailed descriptions of the drawings are omitted, the camera module 405 or the electronic device 400 may further include a barrel structure for disposing the lens(es) 453 in a designated position and/or a driving device for moving forward and backward the lens(es) or at least one of the lens groups G1, G2, and G3 for focus adjustment. In some embodiments, the camera module 405 or the electronic device 400 may further include another driving device for moving the image sensor 451 on a plane substantially perpendicular to the optical axis O direction, and may perform an image stabilization operation by moving the image sensor 451. In another embodiment, the image stabilization operation may be implemented by rotating or tilting the reflective member 455 (e.g., a prism). In the image stabilization operation, the reflective member 455 may be rotated or tilted in an angular range of about 1.5 degrees.

When combined with another camera module (e.g., a wide-angle camera, an ultra-wide-angle camera, or a macro camera), the camera module 405 may function as a tracking or scan camera that tracks the subject within the area of the image captured by the wide-angle camera, ultra-wide-angle camera, or macro camera or scans a partial area of the image. In tracking the subject or scanning a portion of the image area, the angular range in which the reflective member 455 is rotated or tilted may be larger than in the image stabilization operation.

It should be noted that in the drawings, in adding reference numerals to the lens(es) and/or the lens surfaces of the infrared cut filter, the reference numerals for the object-side surfaces are shown in the views (e.g., FIG. 7, 11, 15, 19, or 23) showing the wide-angle end, and the reference numerals for the image sensor-side surfaces are shown in the views (e.g., FIG. 8, 12, 16, 20, or 24) exemplifying the telephoto end. 'Wide-angle end' may mean a position or state in which, in the moving range of the second lens group G2 or third lens group G3, the focal length of the lens assembly 500 is the minimum, and the angle of view is the maximum. 'Telephoto end' may mean a position or state in which, in the moving range of the second lens group G2 or third lens group G3, the focal length of the lens assembly 500 is the maximum, and the angle of view is the minimum. There may be a lens surface that is shown in the tables regarding lens data, but omitted from the drawings. For example, 'S5' in Table 1 may be omitted from FIG. 7 or FIG. 8. The lens surface shown in the tables but omitted from the drawings may mean a structure, such as a film for controlling aberration or blocking stray light. In another embodiment, a structure (e.g., a spacer) for fixing two adjacent lenses may function as a structure for controlling aberration or blocking stray light, and even in this case, it may be omitted from the drawings but may be described as a lens surface in the tables.

In certain embodiments, the first group G1 can include lenses 511, 512, the second group G2, can include lenses 521, 522, and 523, and the third lens group G3 can include lenses 531, and 532. The second and third lens groups G2 and G3 can move along the optical axis O.

Figure 9A:
FIGS. 9A to 9C are graphs illustrating spherical aberration, astigmatism, and distortion rate of the lens assembly of FIG. 7.
Figure 9A:
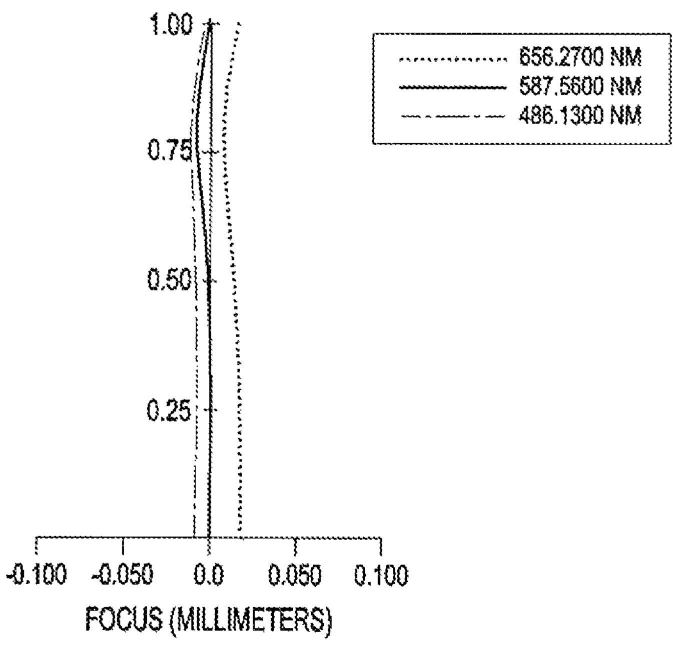
Figures 9B, 9C:
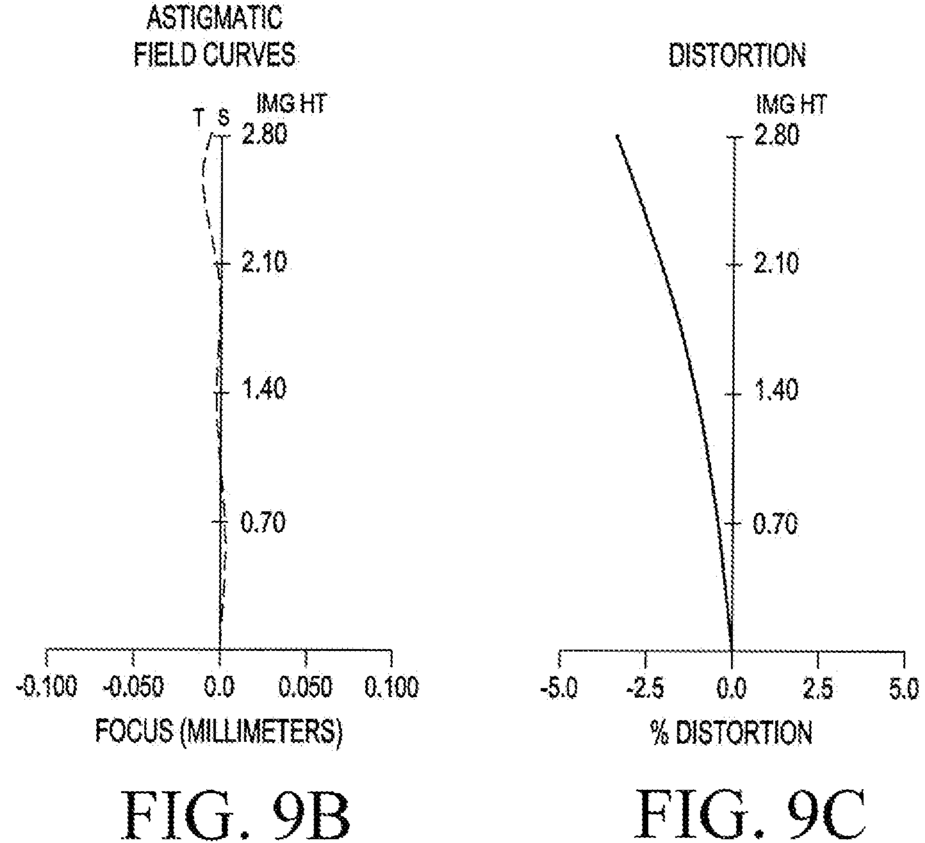
Figure 10A:
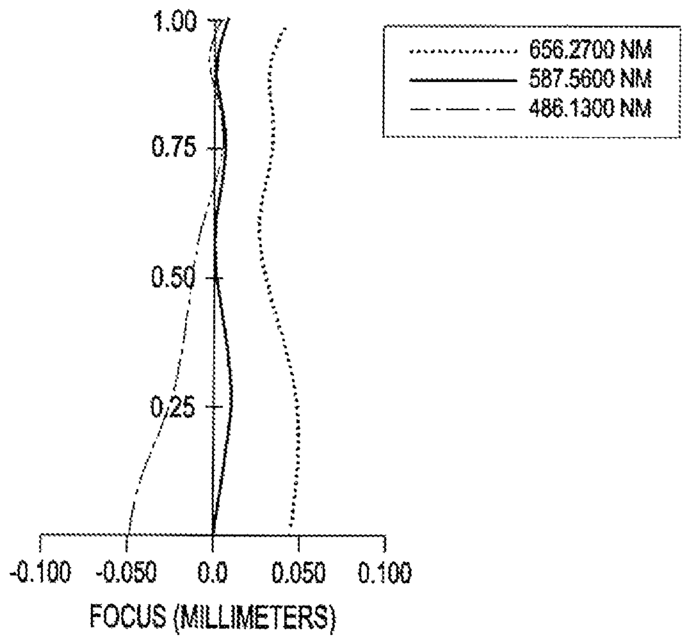
FIGS. 10A to 10C are graphs illustrating spherical aberration, astigmatism, and distortion rate of the lens assembly of FIG. 8.
Figures 10B, 10C:
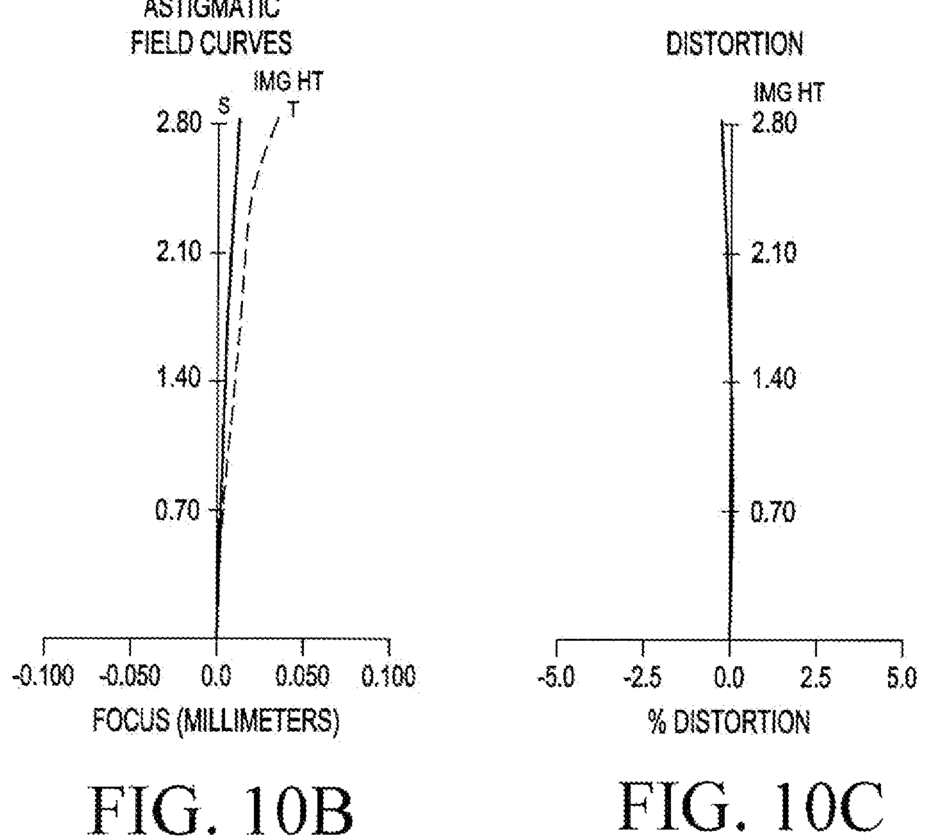

FIG. 7 is a view illustrating a configuration of a lens assembly 500 (e.g., the camera module 405 of FIG. 6) according to certain embodiments of the disclosure, in which a lens (group) arrangement at the wide-angle end is shown. FIG. 8 is a view illustrating the configuration of the lens assembly 500 of FIG. 7, in which an arrangement of lenses (group) at a telephoto end is shown. FIGS. 9A to 9C are graphs illustrating spherical aberration, astigmatism, and distortion rate of the lens assembly 500 of FIG. 7. FIGS. 10A to 10C are graphs illustrating spherical aberration, astigmatism, and distortion rate of the lens assembly 500 of FIG. 8.

Referring to FIGS. 7 to 10C, a lens assembly 500 (e.g., the camera module 405 of FIG. 6) may include an image sensor 451, three lens groups G1, G2, and G3 sequentially arranged from an object obj to the image sensor 451 along an optical axis O direction, and/or an infrared cut filter 457 disposed between the image sensor 451 and the lens groups G1, G2, and G3. The first lens group G1 among the three lens groups G1, G2, and G3 may have a negative refractive power, and be disposed first from the object obj side, in a fixed state with respect to the image sensor 451. Among the three lens groups G1, G2, and G3, the second lens group G2 may have positive refractive power and be disposed between the first lens group G1 and the image sensor, and the third lens group G3 may have negative refractive power and be disposed between the second lens group G2 and the image sensor 451.

The first lens group G1 may include at least two lenses (e.g., two lenses) 511 and 512. At least one of the lenses 511 and 512 of the first lens group G1 may be formed of a glass material. In an embodiment, the lens assembly 500 and/or the first lens group G1 may meet a condition according to Equation 1 below.

$$-1.7 \leq fG11/fG1 \leq -0.6 \qquad \text{[Equation 1]}$$

Here, 'fG11' may be the focal length of the first lens 511 on the object side among the lenses of the first lens group G1, and 'fG1' may be the focal length of the first lens group G1. For example, the first lens group G1 may have a negative refractive power while the first lens 511 may have a positive refractive power. Over the upper limit of the condition presented through Equation 1, the refractive power of the first lens on the object side in the first lens group G1 may be increased, so that although a bright lens assembly 500 may be implemented, it may be hard to correct the spherical aberration. In another embodiment, below the lower limit of the condition presented through Equation 1, the effective diameter of the diaphragm may be increased to implement the bright lens assembly 500, so that it may be difficult to reduce the size of the lens assembly 500.

The lens assembly 500 and/or the first lens group may further meet a condition according to Equation 2 below.

$$1.4 \leq |fG1|/fw \leq 2.5 \qquad \text{[Equation 2]}$$

Here, 'fw' may be the focal length of the lens assembly 500 at the wide-angle end. When the lens assembly 500 and/or the first lens group G1 meet the condition of Equation 2, the refractive power of the first lens group G1 may be controlled and the lens assembly 500 may be downsized. According to an embodiment, over the upper limit of the condition presented through Equation 2, the focal length of the first lens group G1 may be increased, so that the effective diameter of the lens assembly 500 may be increased. In some embodiments, if the focal length of the first lens group G1 is increased, the distance between the first lens on the image sensor side of the third lens group G3 and the imaging plane img at the wide-angle end may decrease. For example, over the upper limit of the condition presented through Equation 2, the incident angle CRA of the outermost ray incident on the imaging plane img at the wide-angle end may increase, and the deviation in the incident angle of the outermost ray at the telephoto end may increase, and it may be hard to control coma aberration. In another embodiment, below the lower limit of the condition presented through Equation 2, the focal length of the first lens group G1 is reduced, so that it may be difficult to correct astigmatism and image field curvature at the wide-angle end.

The second lens group G2 may include at least two lenses (e.g., three lenses) 521, 522, and 523. At least one of the lenses 521, 522, and 523 of the second lens group G2 may be formed of a glass material. In an embodiment, the lens assembly 500 and/or the second lens group G2 may meet a condition according to Equation 3 below.

$$-1.4 \leq fG2n/fG2 \leq -0.5 \qquad \text{[Equation 3]}$$

Here, 'fG2n' may be the focal length of a lens having a negative refractive power among the lenses of the second lens group G2, and 'fG2' may be the focal length of the second lens group G2. When the second lens group G2 meets the condition of Equation 3, the aberration of the lens assembly 500 may be easily corrected. According to an embodiment, over the upper limit of the condition presented through Equation 3, the refractive power of the first lens on the object side in the second lens group G2 may increase, so that it may be difficult to correct astigmatism, and below the lower limit of the condition presented through Equation 3, the refractive power of the first lens on the object side in the second lens group G2 may decrease, so that the sensitivity to the eccentricity error of the lens may be greatly increased.

The third lens group G3 may include two lenses 531 and 532, e.g., one having positive refractive power and the other having negative refractive power and, together with the second lens group G2, may meet the condition according to Equation 4 below, regarding the imaging magnification.

$$-3.2 \leq \beta G3t/\beta G2t \leq -2 \qquad \text{[Equation 4]}$$

Here, 'βG3t' may be the imaging magnification of the third lens group G3 at the telephoto end, and 'βG2t' may be the imaging magnification of the second lens group G2 at the telephoto end. When the condition of Equation 4 is met, in the lens assembly 500, even when the distance that the second lens group G2 or the third lens group G3 moves along the optical axis O direction decreases, it may be easy to compensate for the amount of focus shift of the obtained image. For example, when the condition of Equation 4 is met, the lens assembly 500 may be easy to downsize while implementing a continuous zoom function.

The lens assembly 500 meeting the above-described conditions may have the focal length adjustable within a range of about 11.5 to 27.5 mm, the f-number adjustable in the range of about 2.8 to 5.0, and the angle of view adjustable in the range of about 28.2 to 11.6 degree(s) according to the forward and backward movement of the second lens group G2 and/or the third lens group G3 between the wide-angle end and the telephoto end.

Table 1 and Table 2 below show the lens data of the lens assembly 500 illustrated in FIG. 7 or FIG. 8. 'S1-S17' generally denote the lenses 511, 512, 521, 522, 523, 531, and 532 and/or the lens surface of the infrared cut filter 457. Particularly, 'S5' may denote an area, position, or plane where a structure for controlling aberration or blocking stray light is disposed, and 'img' may denote the imaging plane of the image sensor 451. In an embodiment, the structure for controlling aberration or blocking stray light (e.g., the surface or structure indicated by 'S5' in Table 1) may be implemented in the form of a film, or may be a structure for fixing the lens(es) 511, 512, 521, 522, 523, 531, and 532 and may affect the size of the aperture while providing the function for adjusting the amount of ray bundles per field. In some embodiments, the 'radius of curvature' in Table 1 may be the radius of curvature of the lens surface measured at the point where the optical axis O passes, and the 'thickness or air gap' may be the thickness of the lens 511, 512, 521, 522, 523, 531, and 532 or the gap between two adjacent lenses 511, 512, 521, 522, 523, 531, and 532 measured at the point where the optical axis O passes.

TABLE 1

| lens surface (Surface) | Radius of curvature (radius) | Thickness or air gap (thick or air gap) | Refractive index (nd) | Abbe number (vd) | Focal length (EFL) |
|---|---|---|---|---|---|
| obj | infinity | infinity | | | |
| S1 | 7.933 | 1.23 | 1.642 | 32.86 | 26.8 |
| S2 | 13.84 | 0.10 | | | |
| S3* | 6.514 | 0.75 | 1.544 | 56.09 | −10.9 |
| S4* | 2.983 | D1 | | | |
| S5 | infinity | 0.00 | | | |
| S6(stop)* | 4.869 | 1.95 | 1.543 | 56.02 | 6.2 |
| S7* | −9.586 | 0.23 | | | |
| S8 | −18.294 | 1.00 | 1.713 | 29.51 | −6.7 |
| S9 | 6.642 | 0.24 | | | |

TABLE 1-continued

| lens surface (Surface) | Radius of curvature (radius) | Thickness or air gap (thick or air gap) | Refractive index (nd) | Abbe number (vd) | Focal length (EFL) |
|---|---|---|---|---|---|
| S10* | 5.878 | 1.73 | 1.543 | 56.02 | 9.8 |
| S11* | −50.989 | D2 | | | |
| S12* | −7.678 | 2.00 | 1.635 | 23.89 | 17.1 |
| S13* | −4.954 | 0.14 | | | |
| S14* | −8.019 | 1.09 | 1.544 | 56.09 | −8.6 |
| S15* | 11.6420 | D3 | | | |
| S16 | infinity | 0.21 | 1.5168 | 64.2 | |
| S17 | infinity | — | | | |
| img | infinity | — | | | |

TABLE 2

| Air gap | Wide-angle | Telephoto end |
|---|---|---|
| D1 | 9.45 | 1.41 |
| D2 | 3.85 | 2.14 |
| D3 | 2.99 | 12.74 |

Table 3 and Table 4 below show the aspheric data of the aspheric lenses among the lenses 511, 512, 521, 522, 523, 531, and 532 in the lens assembly 500, and the aspheric surface may be defined by Equation 5 below.

$$x=\frac{c'z^2}{\left(1+\sqrt{1-(K+1)c'^2z^2}\right.}+Az^4+Bz^6+Cz^8+Dz^{10}+Ez^{12}+Fz^{14}+Gz^{16}+Hz^{18}+Jz^{20}$$

Here, 'x' may be the distance in the optical axis (O) direction from the vertex of the lenses 511, 512, 521, 522, 523, 531, and 532, 'z' the distance in the direction perpendicular to the optical axis O, 'c' the reciprocal (=1/radius) of the radius of curvature at the vertex of the lenses 511, 512, 521, 522, 523, 531, and 532, 'K' the Conic constant, and 'A', 'B', 'C', 'D', 'E', 'F', 'G', 'H', and 'J' the aspheric coefficients in Table 3 and Table 4.

TABLE 3

| lens surface | K | A | B | C | D |
|---|---|---|---|---|---|
| S3 | 2.1834 | −1.3376E−02 | 9.6667E−04 | −5.4183E−05 | 7.7621E−07 |
| S4 | −0.5423 | −1.6591E−02 | 1.4255E−03 | −1.0053E−04 | 2.9521E−06 |
| S6 | 0.2996 | −4.2697E−04 | 4.5877E−05 | −2.6993E−06 | 1.0987E−07 |
| S7 | −5.0707 | 3.1856E−03 | −1.7729E−04 | 3.6952E−06 | 0.0000E+00 |
| S10 | 0.9810 | 5.8308E−03 | −1.1651E−04 | 1.6724E−05 | 4.2997E−07 |
| S11 | 10.0000 | 5.5124E−03 | 4.0913E−04 | 3.0018E−05 | 3.3513E−06 |
| S12 | −22.0646 | 1.0126E−03 | 4.5157E−04 | −2.4285E−05 | 0.0000E+00 |
| S13 | −0.3506 | 4.6876E−03 | −1.1549E−04 | 1.5932E−04 | −1.5636E−05 |
| S14 | 3.2636 | −1.8065E−02 | 2.3949E−03 | −8.4720E−05 | −8.8658E−06 |
| S15 | −34.4025 | −1.5974E−02 | 2.8721E−03 | −4.3255E−04 | 4.2326E−05 |

TABLE 4

| lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | −1.9757E−06 | 0.0000E+00 | 0.0000E+00 | 0.0000E+00 | 0.0000E+00 |

In certain embodiments, the first lens group G1 may include lenses 611, 612, 613, the second lens group G2 may include lenses 621, 622, and 623, and the third lens group G3 may include lenses 631, and 632.

Figure 11:
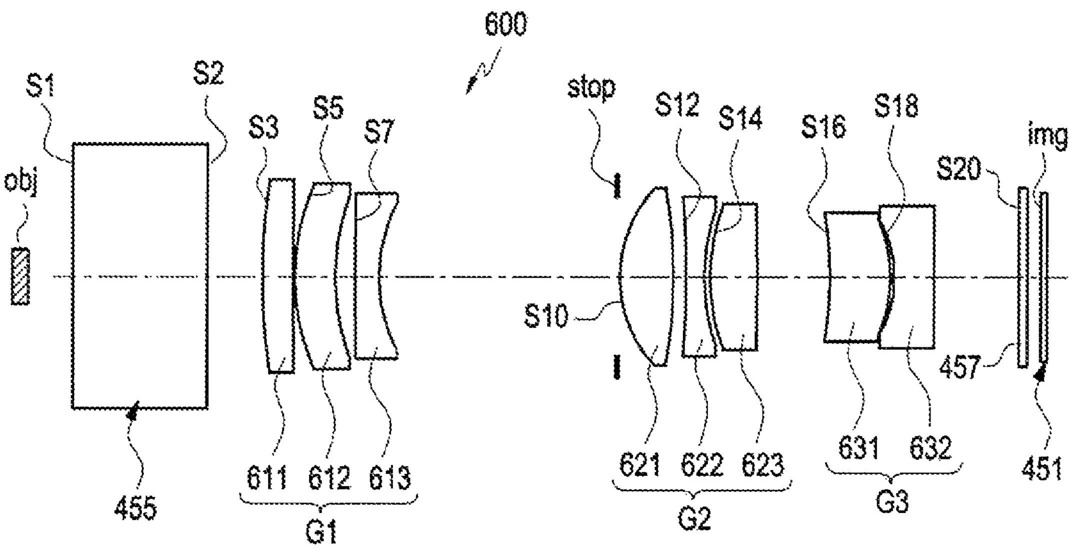
FIG. 11 is a view illustrating a configuration of a lens assembly according to certain embodiments of the disclosure, in which an arrangement of lenses (group) at a wide-angle end is shown.
Figure 12:
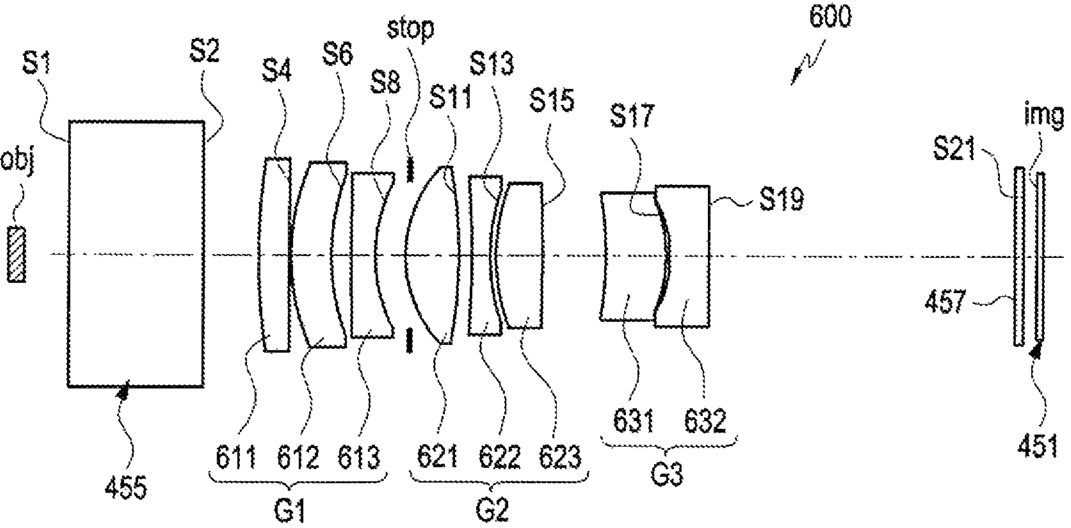
FIG. 12 is a view illustrating the configuration of the lens assembly of FIG. 11, in which an arrangement of lenses (group) at a telephoto end is shown.
Figure 13A:
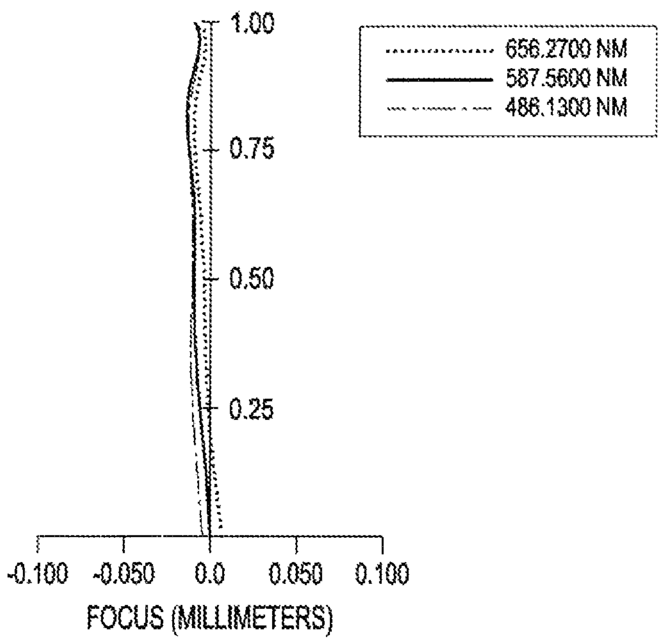
FIGS. 13A to 13C are graphs illustrating spherical aberration, astigmatism, and distortion rate of the lens assembly of FIG. 11.
Figures 13B, 13C:
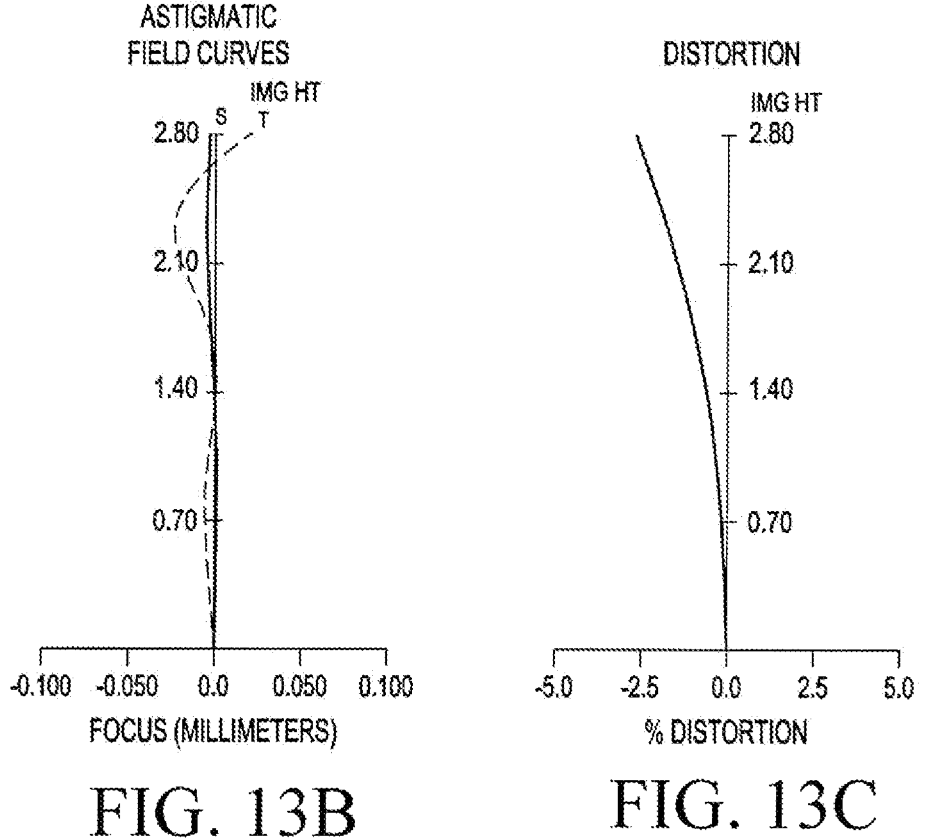
Figure 14A:
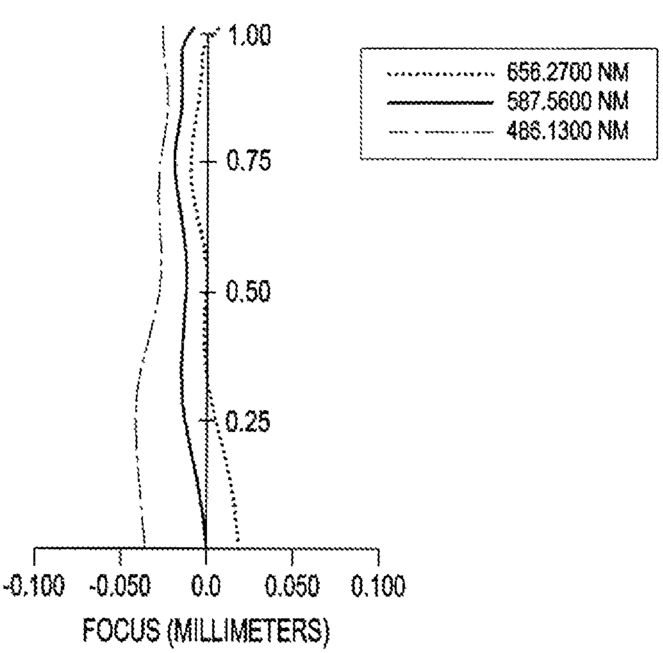
FIGS. 14A to 14C are graphs illustrating spherical aberration, astigmatism, and distortion rate of the lens assembly of FIG. 12.
Figures 14B, 14C:
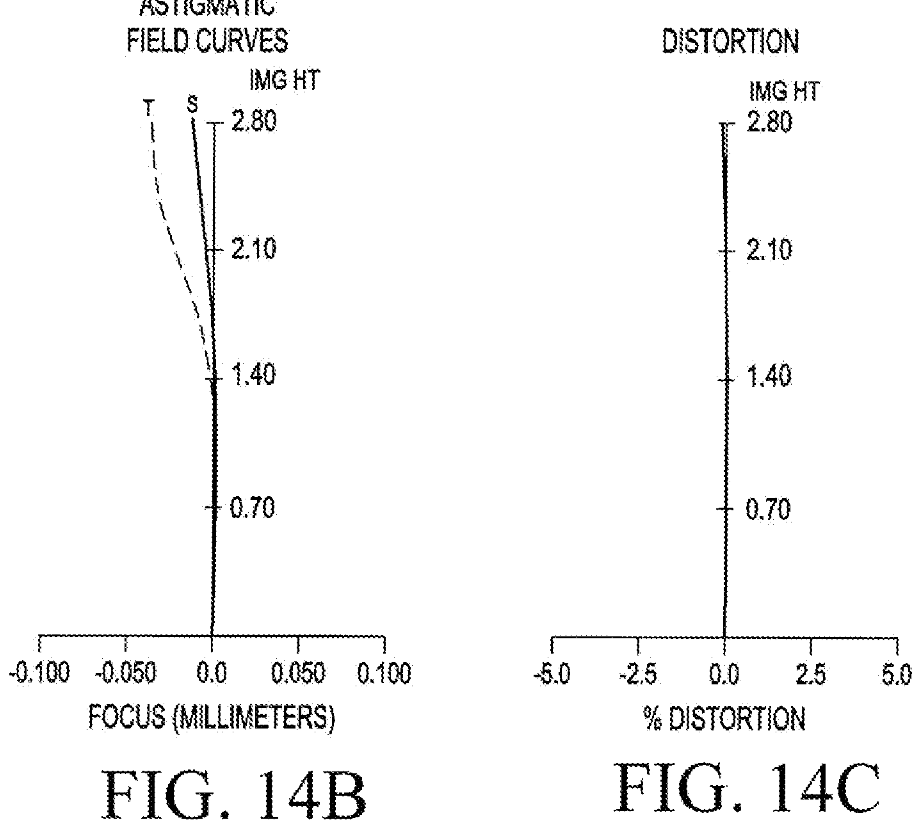

FIG. 11 is a view illustrating a configuration of a lens assembly 600 (e.g., the camera module 405 of FIG. 5) according to certain embodiments of the disclosure, in which a lens (group) arrangement at the wide-angle end is shown. FIG. 12 is a view illustrating the configuration of the lens assembly 600 of FIG. 11, in which an arrangement of lenses (group) at a telephoto end is shown. FIGS. 13A to 13C are graphs illustrating spherical aberration, astigmatism, and distortion rate of the lens assembly 600 of FIG. 11. FIGS. 14A to 14C are graphs illustrating spherical aberration, astigmatism, and distortion rate of the lens assembly 600 of FIG. 12. Referring to FIGS. 11 to 14C, the lens assembly 600 may meet at least one of the configurations mentioned in the above-described embodiments or conditions suggested through the equations, and may include the reflective member 455, the first lens group G1, the second lens group G2, the third lens group G3, the infrared cut filter 457, and the image sensor 451 which are sequentially arranged from the object (obj) side. The first lens group G1 may include three lenses 611, 612, and 613. The second lens group G2 may include three lenses 621, 622, and 623, and the third lens group G3 may include two lenses 631 and 632. In the illustrated embodiment, 'S1' may denote the incident surface (e.g., the incident surface I of FIG. 6) of the reflective member 455, and 'S2' may denote the exit surface (e.g., the exit surface E of FIG. 6) of the reflective member 455.

The lens assembly 600 may meet at least one of the above-described conditions and may have the focal length adjustable within a range of about 11.5 to 27.5 mm, the f-number adjustable in the range of about 2.7 to 4.7, and the angle of view adjustable in the range of about 28.0 to 11.6 degree(s) according to the forward and backward movement of the second lens group G2 and/or the third lens group G3 between the wide-angle end and the telephoto end.

Table 5 and Table 6 below show the lens data of the lens assembly 600 illustrated in FIG. 11 or 12, and Table 7 and Table 8 show the aspheric coefficients of the aspheric lenses among the lenses 511, 512, 513, 521, 522, 523, 531, and 532.

TABLE 5

| lens surface (Surface) | Radius of curvature (radius) | Thickness or air gap (thick or air gap) | Refractive index (nd) | Abbe number (vd) | Focal length (EFL) |
|---|---|---|---|---|---|
| obj | infinity | Infinity | | | |
| S1 | infinity | 4.50 | 1.717 | 29.5 | |

TABLE 5-continued

| lens surface (Surface) | Radius of curvature (radius) | Thickness or air gap (thick or air gap) | Refractive index (nd) | Abbe number (vd) | Focal length (EFL) |
|---|---|---|---|---|---|
| S2 | infinity | 1.80 | | | |
| S3 | 21.865 | 1.06 | 1.673 | 32.17 | 33.3 |
| S4 | 861.940 | 0.03 | | | |
| S5* | 8.834 | 1.34 | 1.535 | 55.75 | 405.2 |
| S6* | 8.723 | 0.67 | | | |
| S7* | 9.842 | 0.82 | 1.535 | 55.75 | −10.6 |
| S8* | 3.485 | D1 | | | |
| S9(stop) | infinity | −0.10 | | | |
| S10* | 4.494 | 1.77 | 1.535 | 55.75 | 6.1 |
| S11* | −10.555 | 0.47 | | | |
| S12 | −27.731 | 0.60 | 1.762 | 26.61 | −7.3 |
| S13 | 7.013 | 0.20 | | | |
| S14* | 7.932 | 1.66 | 1.535 | 55.75 | 10.1 |
| S15* | −15.5900 | D2 | | | |
| S16* | −6.9720 | 2.00 | 1.65101 | 21.49 | 15.9 |
| S17* | −4.6370 | 0.12 | | | |
| S18* | −7.6920 | 1.35 | 1.535 | 55.75 | −8.1 |
| S19* | 10.5450 | D3 | | | |
| S20 | infinity | 0.21 | 1.5168 | 64.2 | |
| S21 | infinity | — | | | |
| img | infinity | — | | | |

TABLE 6

| Air gap | Wide-angle | Telephoto end |
|---|---|---|
| D1 | 8.77 | 1.21 |
| D2 | 3.48 | 2.08 |
| D3 | 2.87 | 11.83 |

TABLE 7

| lens surface | K | A | B | C | D |
|---|---|---|---|---|---|
| S5 | 1.5147 | 5.9033E−04 | −1.4898E−04 | 1.3786E−05 | −4.0575E−07 |
| S6 | 1.6279 | 1.4782E−03 | −5.3496E−04 | 5.5266E−05 | 1.6653E−07 |
| S7 | 6.8331 | −1.2404E−02 | 5.5014E−04 | 3.3246E−05 | −2.7146E−06 |
| S8 | −0.0511 | −1.7369E−02 | 1.3593E−03 | −7.0714E−05 | −6.3344E−07 |
| S10 | 0.1510 | −1.0361E−04 | 2.7160E−05 | −2.0270E−06 | −2.0701E−07 |
| S11 | −4.7208 | 3.8281E−03 | −2.7497E−04 | 5.8583E−06 | 0.0000E+00 |
| S14 | −2.2129 | 5.2906E−03 | −3.5823E−04 | 1.0711E−05 | 0.0000E+00 |
| S15 | 23.3303 | 3.9729E−03 | 2.2303E−04 | −4.5648E−06 | 2.3406E−06 |
| S16 | −15.5700 | 1.4810E−03 | 3.1868E−04 | −1.0832E−05 | 0.0000E+00 |
| S17 | −0.4951 | 2.1002E−03 | 1.0467E−03 | −2.8037E−04 | 3.2895E−05 |
| S18 | 6.0634 | −1.8384E−02 | 3.5529E−03 | −6.1768E−04 | 6.3764E−05 |
| S19 | −10.4142 | −1.5621E−02 | 2.6914E−03 | −3.9677E−04 | 3.9379E−05 |

TABLE 8

| lens surface | E | F | G | H | J |
|---|---|---|---|---|---|
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | 0.0000E+00 | 0.0000E+00 | 0.0000E+00 | 0.0000E+00 | 0.0000E+00 |
| S17 | 0.0000E+00 | 0.0000E+00 | 0.0000E+00 | 0.0000E+00 | 0.0000E+00 |
| S18 | 0.0000E+00 | 0.0000E+00 | 0.0000E+00 | 0.0000E+00 | 0.0000E+00 |
| S19 | −1.5602E−06 | 0.0000E+00 | 0.0000E+00 | 0.0000E+00 | 0.0000E+00 |

In certain embodiments, the first group G1 can include lenses 711, 712, 713, the second group G2, can include lenses 721 . . . 724, and the third lens group G3 can include lenses 731, and 732. The second and third lens groups G2 and G3 can move along the optical axis O.

Figure 15:
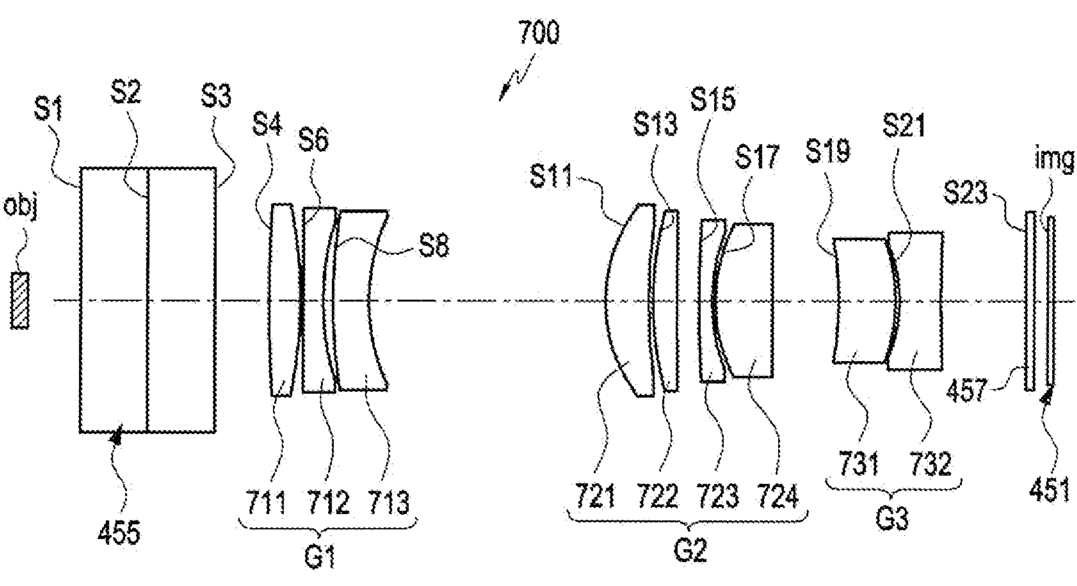
FIG. 15 is a view illustrating a configuration of a lens assembly according to certain embodiments of the disclosure, in which an arrangement of lenses (group) at a wide-angle end is shown.
Figure 16:
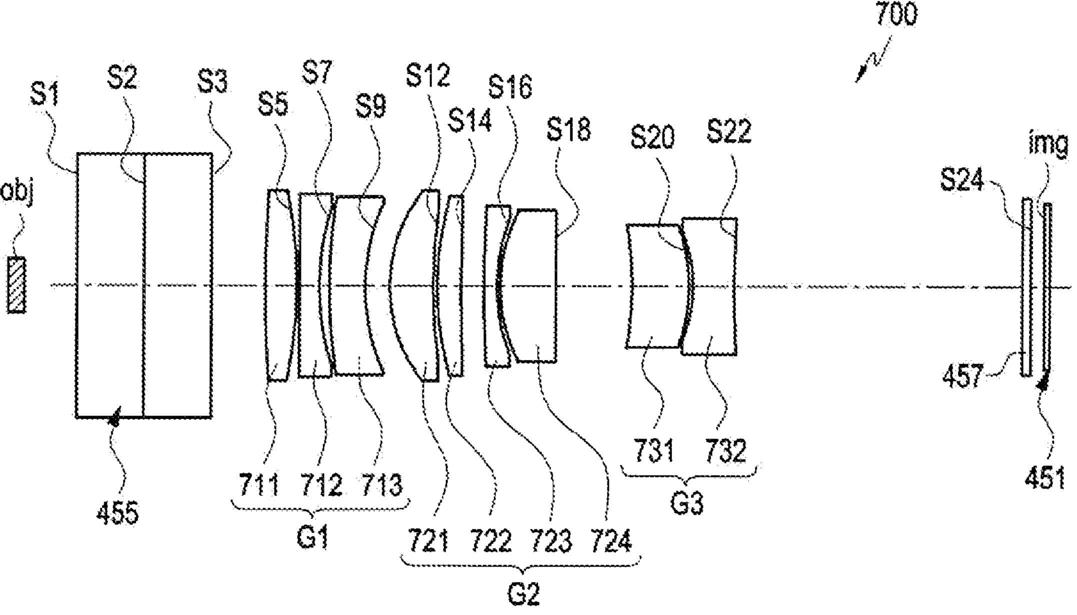
FIG. 16 is a view illustrating the configuration of the lens assembly of FIG. 15, in which an arrangement of lenses (group) at a telescopic end is shown.
Figure 17A:
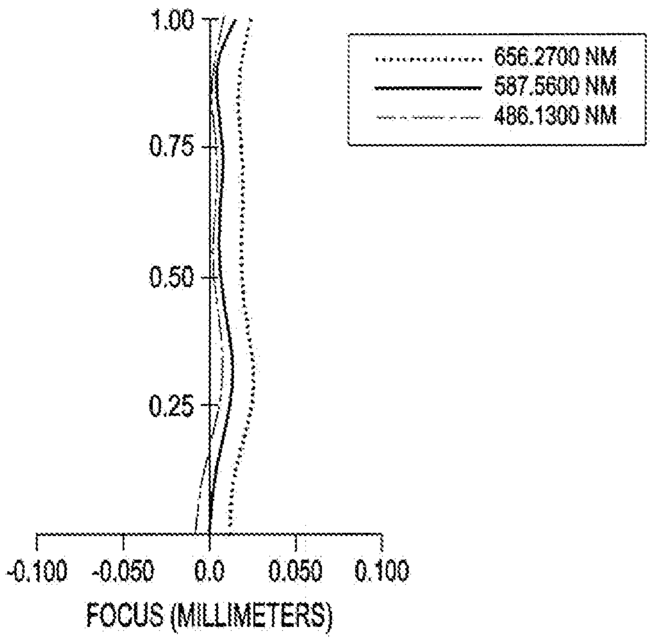
FIGS. 17A to 17C are graphs illustrating spherical aberration, astigmatism, and distortion rate of the lens assembly of FIG. 15.
Figures 17B, 17C:
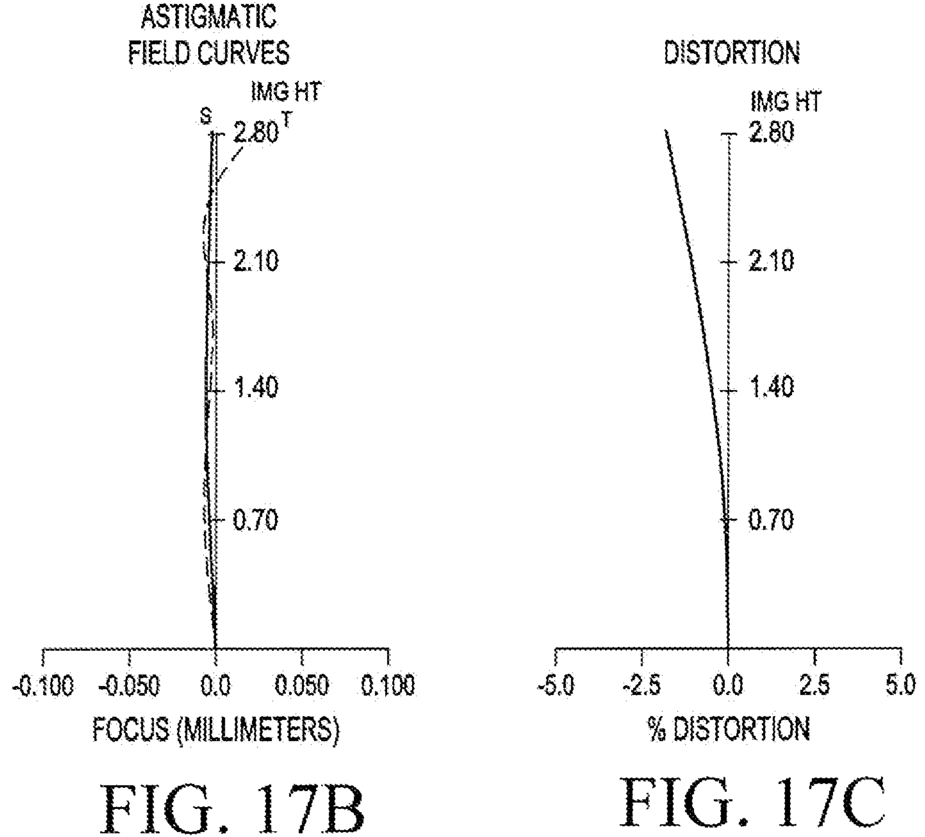
Figure 18A:
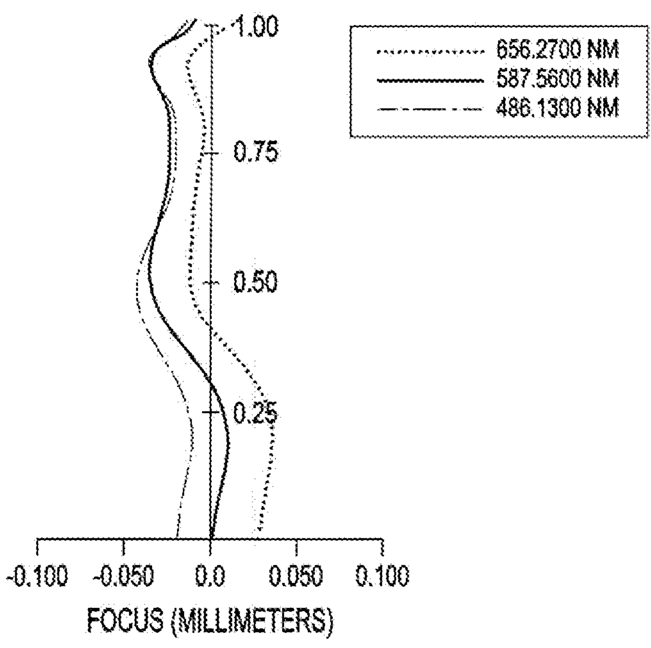
FIGS. 18A to 18C are graphs illustrating spherical aberration, astigmatism, and distortion rate of the lens assembly of FIG. 16.
Figures 18B, 18C:
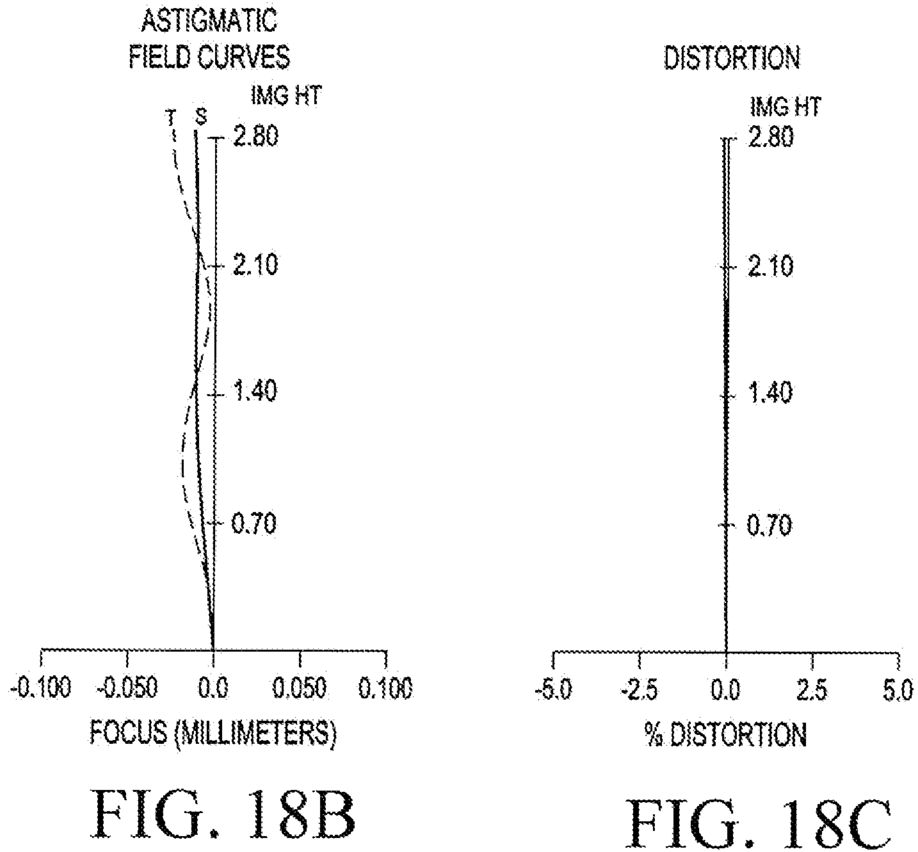

FIG. 15 is a view illustrating a configuration of a lens assembly 700 (e.g., the camera module 405 of FIG. 6) according to certain embodiments of the disclosure, in which a lens (group) arrangement at the wide-angle end is shown. FIG. 16 is a view illustrating the configuration of the lens assembly 700 of FIG. 15, in which an arrangement of lenses (group) at a telephoto end is shown. FIGS. 17A to 17C are graphs illustrating spherical aberration, astigmatism, and distortion rate of the lens assembly 700 of FIG. 15. FIGS. 18A to 18C are graphs illustrating spherical aberration, astigmatism, and distortion rate of the lens assembly 700 of FIG. 16.

Referring to FIGS. 15 to 18C, the lens assembly 700 may meet at least one of the configurations mentioned in the above-described embodiments or conditions suggested through the equations, and may include the reflective member 455, the first lens group G1, the second lens group G2, the third lens group G3, the infrared cut filter 457, and the image sensor 451 which are sequentially arranged from the object (obj) side. The first lens group G1 may include three lenses 711, 712, and 713. The second lens group G2 may include four lenses 721, 722, 723, and 724, and the third lens group G3 may include two lenses 731 and 732. In the illustrated embodiment, 'S1' may denote the incident surface (e.g., the incident surface I of FIG. 6) of the reflective member 455, 'S2' may denote the reflective surface (e.g., the reflective surface R of FIG. 6) of the reflective member 455, and 'S3' may denote the exit surface (e.g., the exit surface E of FIG. 6) of the reflective member 455.

The lens assembly 700 may meet at least one of the above-described conditions and may have the focal length adjustable within a range of about 11.2 to 26.7 mm, the f-number adjustable in the range of about 2.6 to 4.5, and the angle of view adjustable in the range of about 28.4 to 12.0 degree(s) according to the forward and backward movement of the second lens group G2 and/or the third lens group G3 between the wide-angle end and the telephoto end.

Table 9 and Table 10 below show the lens data of the lens assembly 700 illustrated in FIG. 11 or 12, and Table 11 and Table 12 show the aspheric coefficients of the aspheric lenses among the lenses 711, 712, 713, 721, 722, 723, 724, 731, and 732.

TABLE 9

| lens surface (Surface) | Radius of curvature (radius) | Thickness or air gap (thick or air gap) | Refractive index (nd) | Abbe number (vd) | Focal length (EFL) |
|---|---|---|---|---|---|
| obj | infinity | Infinity | | | |
| S1 | infinity | 2.25 | 1.717 | 29.5 | |
| S2 | infinity | 2.25 | 1.717 | 29.5 | |
| S3 | infinity | 1.80 | | | |

TABLE 9-continued

| lens surface (Surface) | Radius of curvature (radius) | Thickness or air gap (thick or air gap) | Refractive index (nd) | Abbe number (vd) | Focal length (EFL) |
|---|---|---|---|---|---|
| S4 | 56.838 | 1.07 | 1.648 | 33.84 | 18.4 |
| S5 | −14.956 | 0.03 | | | |
| S6* | 31.530 | 0.70 | 1.544 | 55.92 | −30.9 |
| S7* | 10.877 | 0.31 | | | |
| S8* | 13.721 | 1.19 | 1.535 | 55.75 | −12.0 |
| S9* | 4.251 | D1 | | | |
| S10 | infinity | 0.00 | | | |
| S11(stop) | 5.448 | 1.49 | 1.593 | 68.62 | 11.9 |
| S12 | 21.694 | 0.15 | | | |
| S13* | 10.725 | 0.82 | 1.535 | 55.75 | 19.4 |
| S14* | −291.175 | 0.73 | | | |
| S15 | 32.5739 | 0.45 | 1.847 | 23.78 | −10.3 |
| S16 | 6.8604 | 0.10 | | | |
| S17* | 6.7005 | 1.92 | 1.535 | 55.75 | 10.4 |
| S18* | −30.2332 | D2 | | | |
| S19* | −8.5931 | 2.00 | 1.66076 | 20.38 | 17.5 |
| S20* | −5.3809 | 0.11 | | | |
| S21* | −8.4765 | 1.37 | 1.535 | 55.75 | −8.2 |
| S22* | 9.7002 | D3 | | | |
| S23 | infinity | 0.21 | 1.5168 | 64.2 | |
| S24 | infinity | – | | | |
| S25 | infinity | – | | | |

TABLE 10

| Air gap | Wide-angle | Telephoto end |
|---|---|---|
| D1 | 8.06 | 0.90 |
| D2 | 3.31 | 2.60 |
| D3 | 2.91 | 10.78 |

TABLE 11

| lens surface | K | A | B | C | D |
|---|---|---|---|---|---|
| S6 | −30.0000 | 7.5718E−04 | −6.5572E−04 | 1.6355E−04 | −2.7624E−05 |
| S7 | 2.3576 | 8.7188E−04 | −6.6120E−04 | 3.3709E−04 | −5.9989E−05 |
| S8 | 15.4066 | −8.8168E−03 | 9.5383E−04 | 1.0509E−04 | −4.3465E−05 |
| S9 | 0.1801 | −1.2259E−02 | 1.3568E−03 | −1.6418E−04 | 5.5567E−06 |
| S13 | −2.5027 | −1.1465E−03 | 2.8268E−04 | −4.4222E−05 | 2.3608E−06 |
| S14 | −62.2599 | −4.5537E−04 | 5.0992E−04 | −1.0247E−04 | 7.7451E−06 |
| S17 | −4.7774 | 2.6891E−03 | 4.5284E−04 | −1.4351E−04 | 2.1684E−05 |
| S18 | 14.4185 | 2.4097E−03 | 6.5298E−05 | 1.4879E−04 | −8.5598E−05 |
| S19 | −14.8032 | 2.4163E−03 | 8.5167E−04 | −6.1069E−04 | 2.3344E−04 |
| S20 | −0.4673 | −3.5715E−03 | 9.5398E−03 | −5.0940E−03 | 5.3295E−04 |
| S21 | −2.2811 | −2.4973E−02 | 1.4963E−02 | −7.1013E−03 | −1.5613E−04 |
| S22 | 7.5776 | −1.7090E−02 | 5.0263E−03 | −2.8429E−03 | 1.2634E−03 |

TABLE 12

| lens surface | E | F | G | H | J |
|---|---|---|---|---|---|
| S6 | 2.2917E−06 | −7.2305E−08 | 0.0000E+00 | 0.0000E+00 | 0.0000E+00 |
| S7 | 4.0772E−06 | −7.9132E−08 | 0.0000E+00 | 0.0000E+00 | 0.0000E+00 |
| S8 | 5.3970E−06 | −3.8598E−07 | 1.4100E−08 | 0.0000E+00 | 0.0000E+00 |
| S9 | 1.4131E−06 | −2.0458E−07 | 8.4179E−09 | 0.0000E+00 | 0.0000E+00 |
| S13 | 0.0000E+00 | 0.0000E+00 | 0.0000E+00 | 0.0000E+00 | 0.0000E+00 |
| S14 | −1.5515E−07 | 0.0000E+00 | 0.0000E+00 | 0.0000E+00 | 0.0000E+00 |
| S17 | −2.0095E−06 | 1.1149E−07 | 0.0000E+00 | 0.0000E+00 | 0.0000E+00 |
| S18 | 2.3337E−05 | −3.1768E−06 | 1.8020E−07 | 0.0000E+00 | 0.0000E+00 |
| S19 | −4.4030E−05 | 3.3197E−06 | 0.0000E+00 | 0.0000E+00 | 0.0000E+00 |
| S20 | 4.8614E−04 | −1.5695E−04 | −5.1038E−06 | 8.2235E−06 | −9.3893E−07 |
| S21 | 1.6654E−03 | −7.3025E−04 | 1.3707E−04 | −9.9233E−06 | 0.0000E+00 |
| S22 | −3.5695E−04 | 6.1143E−05 | −5.8028E−06 | 2.3371E−07 | 0.0000E+00 |

In certain embodiments, the first group G1 can include lenses 811, 812, and 813, the second group G2, can include lenses 821, 822, and 823, and the third lens group G3 can include lenses 831, and 832. The second and third lens groups G2 and G3 can move along the optical axis O.

Figure 19:
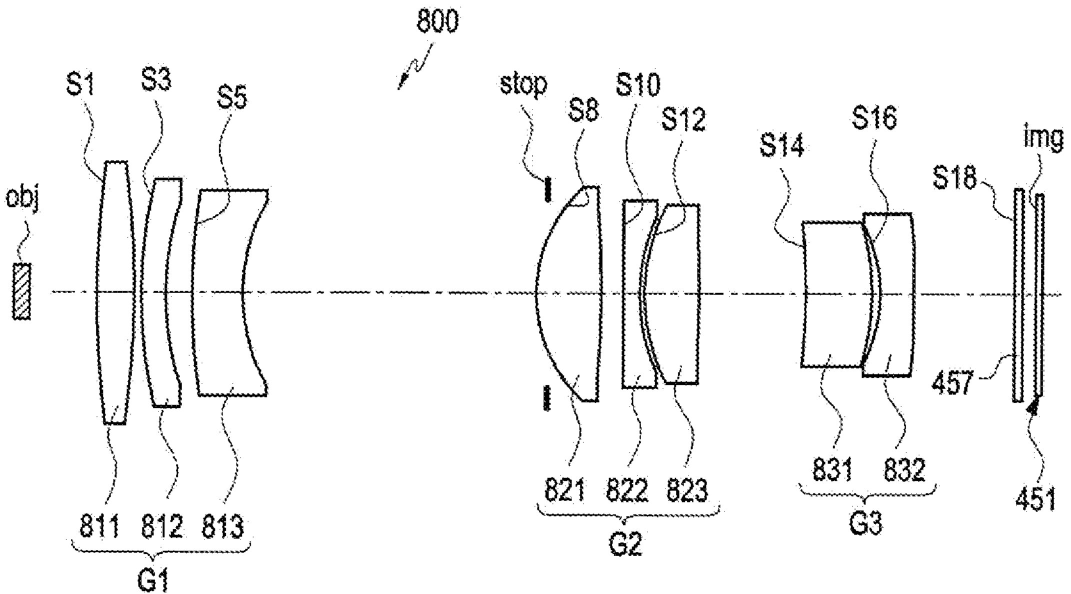
FIG. 19 is a view illustrating a configuration of a lens assembly according to certain embodiments of the disclosure, in which an arrangement of lenses (group) at a wide-angle end is shown.
Figure 20:
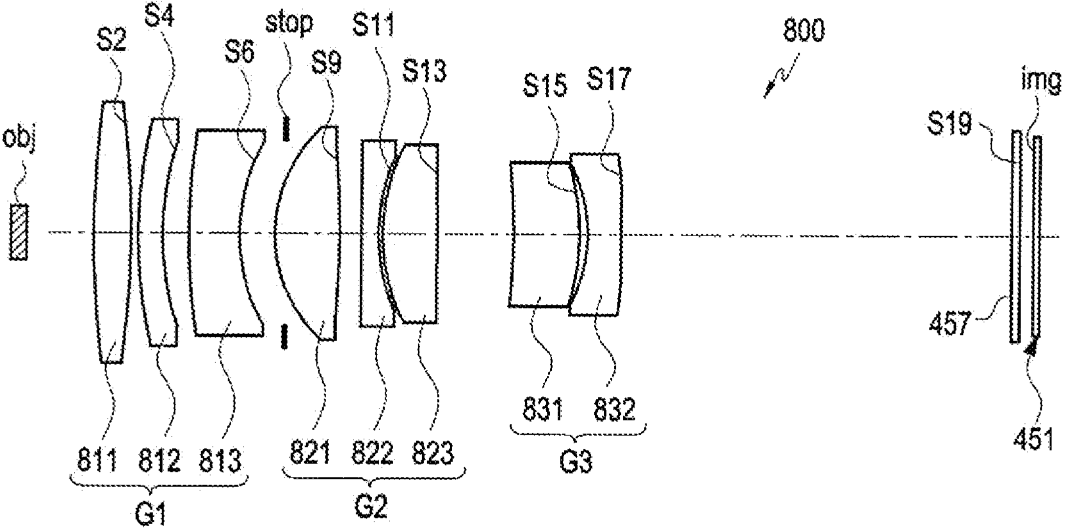
FIG. 20 is a view illustrating the configuration of the lens assembly of FIG. 19, in which an arrangement of lenses (group) at a telephoto end is shown.
Figure 21A:
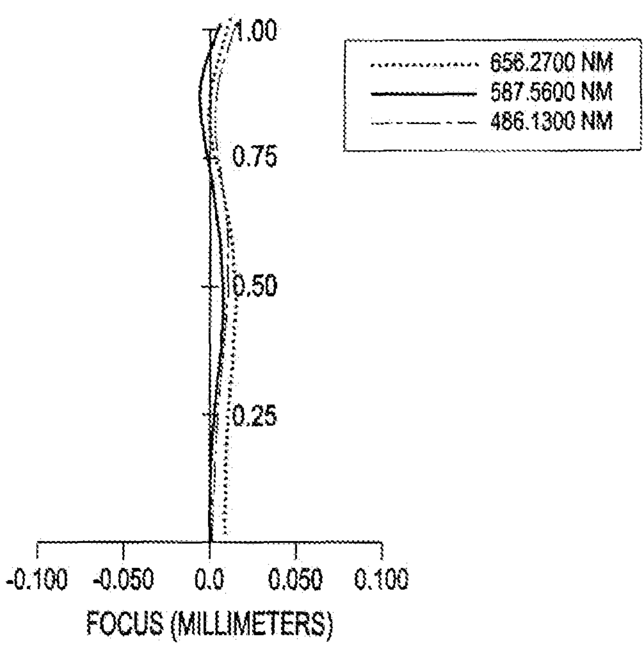
FIGS. 21A to 21C are graphs illustrating spherical aberration, astigmatism, and distortion rate of the lens assembly of FIG. 19.
Figures 21B, 21C:
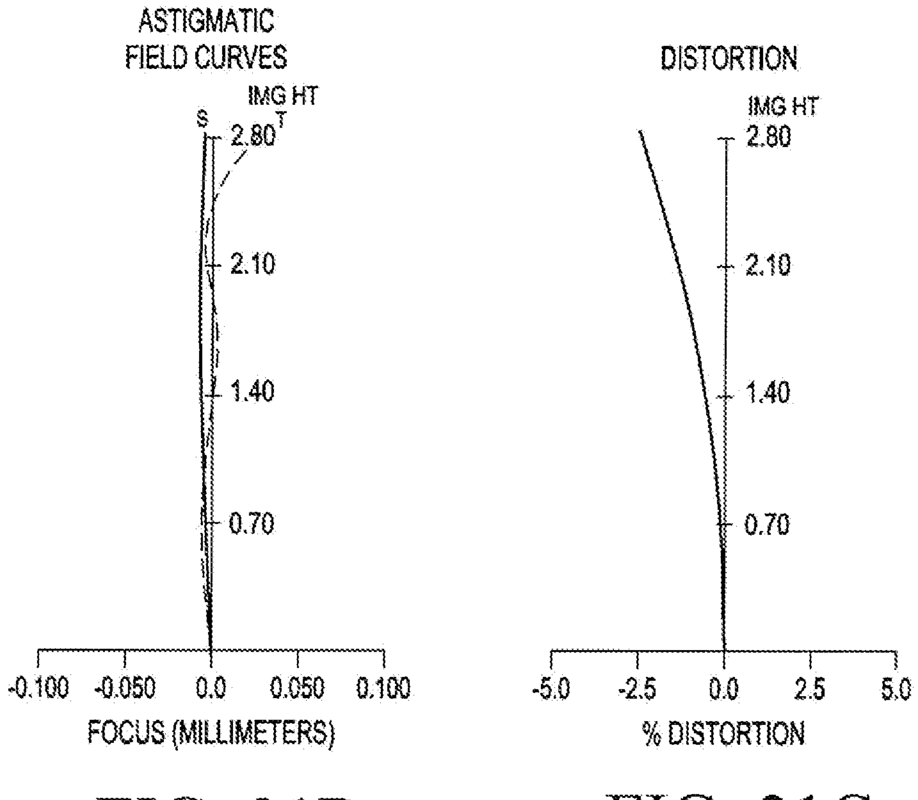
Figure 22A:
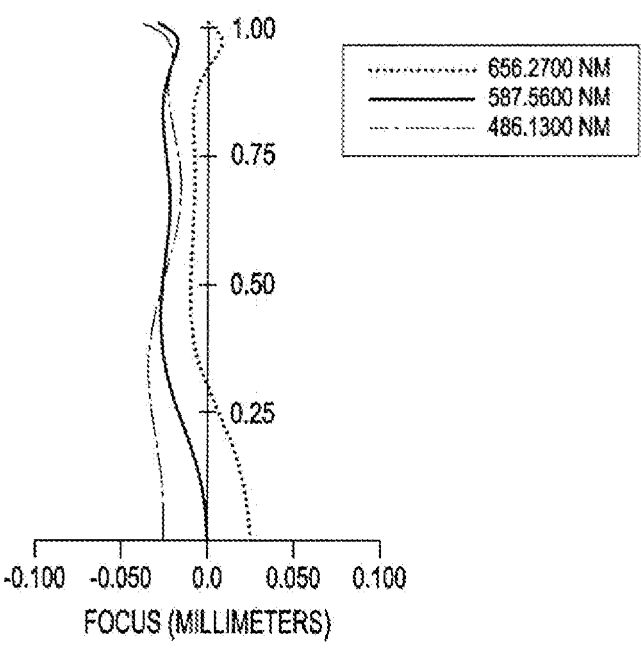
FIGS. 22A to 22C are graphs illustrating spherical aberration, astigmatism, and distortion rate of the lens assembly of FIG. 20.
Figures 22B, 22C:
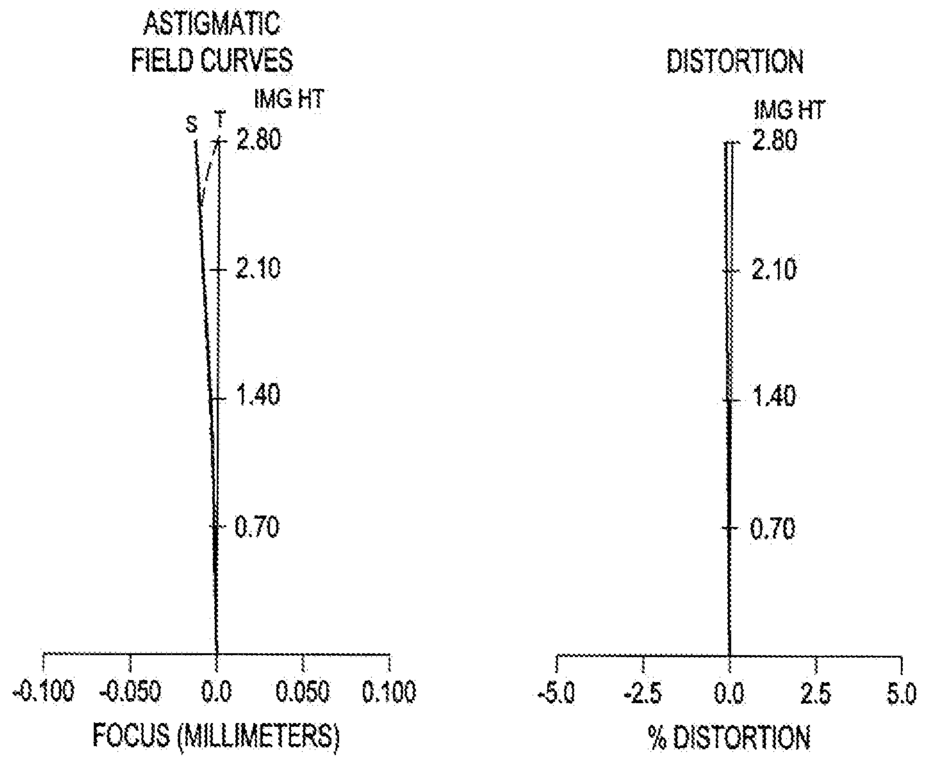

FIG. 19 is a view illustrating a configuration of a lens assembly 800 (e.g., the camera module 405 of FIG. 6) according to certain embodiments of the disclosure, in which a lens (group) arrangement at the wide-angle end is shown. FIG. 20 is a view illustrating the configuration of the lens assembly 800 of FIG. 19, in which an arrangement of lenses (group) at a telephoto end is shown. FIGS. 21A to 21C are graphs illustrating spherical aberration, astigmatism, and distortion rate of the lens assembly 800 of FIG. 19. FIGS. 22A to 22C are graphs illustrating spherical aberration, astigmatism, and distortion rate of the lens assembly 800 of FIG. 20.

Referring to FIGS. 19 to 22C, the lens assembly 800 may meet at least one of the configurations mentioned in the above-described embodiments or conditions suggested through the equations, and may include the first lens group G1, the second lens group G2, the third lens group G3, the infrared cut filter 457, and the image sensor 451 which are sequentially arranged from the object (obj) side. The first lens group G1 may include three lenses 811, 812, and 813. The second lens group G2 may include three lenses 821, 822, and 823, and the third lens group G3 may include two lenses 831 and 832.

The lens assembly 800 may meet at least one of the above-described conditions and may have the focal length adjustable within a range of about 11.4 to 27.8 mm, the f-number adjustable in the range of about 3.0 to 5.3, and the angle of view adjustable in the range of about 28.8 to 11.8 degree(s) according to the forward and backward movement of the second lens group G2 and/or the third lens group G3 between the wide-angle end and the telephoto end.

Table 13 and Table 14 below show the lens data of the lens assembly 800 illustrated in FIG. 19 or 20, and Table 15 and Table 16 show the aspheric coefficients of the aspheric lenses among the lenses 811, 812, 813, 821, 822, 823, 831, and 832.

TABLE 13

| lens surface (Surface) | Radius of curvature (radius) | Thickness or air gap (thick or air gap) | Refractive index (nd) | Abbe number (vd) | Focal length (EFL) |
|---|---|---|---|---|---|
| Obj | infinity | Infinity | | | |
| S1 | 28.611 | 1.07 | 1.648 | 33.84 | 23.1 |
| S2 | −31.016 | 0.23 | | | |
| S3* | 15.427 | 0.70 | 1.535 | 55.75 | −63.1 |
| S4* | 10.419 | 0.78 | | | |
| S5* | 10.954 | 1.42 | 1.535 | 55.75 | −11.3 |
| S6* | 3.724 | D1 | | | |
| S7(stop) | infinity | −0.30 | | | |
| S8* | 4.360 | 1.84 | 1.497 | 81.56 | 7.1 |
| S9* | −15.562 | 0.62 | | | |
| S10 | 379.97 | 0.47 | 1.690 | 31.14 | −8.7 |
| S11 | 5.873 | 0.14 | | | |
| S12* | 7.110 | 1.60 | 1.535 | 55.75 | 9.7 |
| S13* | −18.036 | D2 | | | |
| S14* | −9.350 | 1.93 | 1.651 | 21.49 | 17.1 |
| S15* | −5.4960 | 0.20 | | | |
| S16* | −6.7850 | 0.93 | 1.535 | 55.75 | −8.4 |
| S17* | 14.0510 | D3 | | | |
| S18 | infinity | 0.21 | 1.517 | 64.2 | |
| S19 | infinity | D4 | | | |
| Img | infinity | D5 | | | |

TABLE 14

| Air gap | Wide-angle | Telephoto end |
|---|---|---|
| D1 | 8.86 | 1.30 |
| D2 | 3.59 | 2.20 |
| D3 | 2.96 | 11.91 |

TABLE 15

| lens surface | K | A | B | C | D |
|---|---|---|---|---|---|
| S3 | 1.2560 | −1.4668E−04 | −3.5351E−05 | 1.3209E−05 | −7.6876E−07 |
| S4 | 0.3292 | −7.1568E−04 | 9.4768E−05 | 1.7145E−05 | 0.0000E+00 |
| S5 | 9.4718 | −8.3944E−03 | 4.9172E−04 | 5.0547E−07 | −7.0009E−07 |
| S6 | 0.0844 | −1.1817E−02 | 6.6633E−04 | −4.0833E−05 | −7.0318E−08 |
| S8 | 0.0000 | −4.7169E−04 | 3.4260E−05 | −1.9138E−06 | 0.0000E+00 |
| S9 | 0.3738 | 2.8296E−03 | −1.1803E−04 | 1.4458E−06 | 0.0000E+00 |
| S12 | −2.4761 | 4.3840E−03 | −1.2665E−04 | 6.1602E−06 | 0.0000E+00 |
| S13 | 19.4352 | 3.6125E−03 | 1.3354E−04 | 6.7838E−06 | 2.1090E−06 |
| S14 | −18.9811 | 3.2399E−03 | −1.7713E−04 | 5.9008E−05 | 0.0000E+00 |
| S15 | −0.0262 | 4.9692E−03 | −1.0661E−03 | 1.9375E−04 | 2.5709E−06 |
| S16 | 4.9926 | −1.5416E−02 | 8.1234E−04 | 2.1489E−04 | −1.7808E−05 |
| S17 | 0.0000 | −1.7572E−02 | 2.6137E−03 | −2.3895E−04 | 6.7291E−06 |

TABLE 16

| lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | 0.0000E+00 | 0.0000E+00 | 0.0000E+00 | 0.0000E+00 | 0.0000E+00 |
| S17 | 1.7746E−07 | 0.0000E+00 | 0.0000E+00 | 0.0000E+00 | 0.0000E+00 |

In certain embodiments, the first group G1 can include lenses 911, 912, the second group G2, can include lenses 921 . . . 924, and the third lens group G3 can include lenses 931, and 932. The second and third lens groups G2 and G3 can move along the optical axis O.

Figure 23:
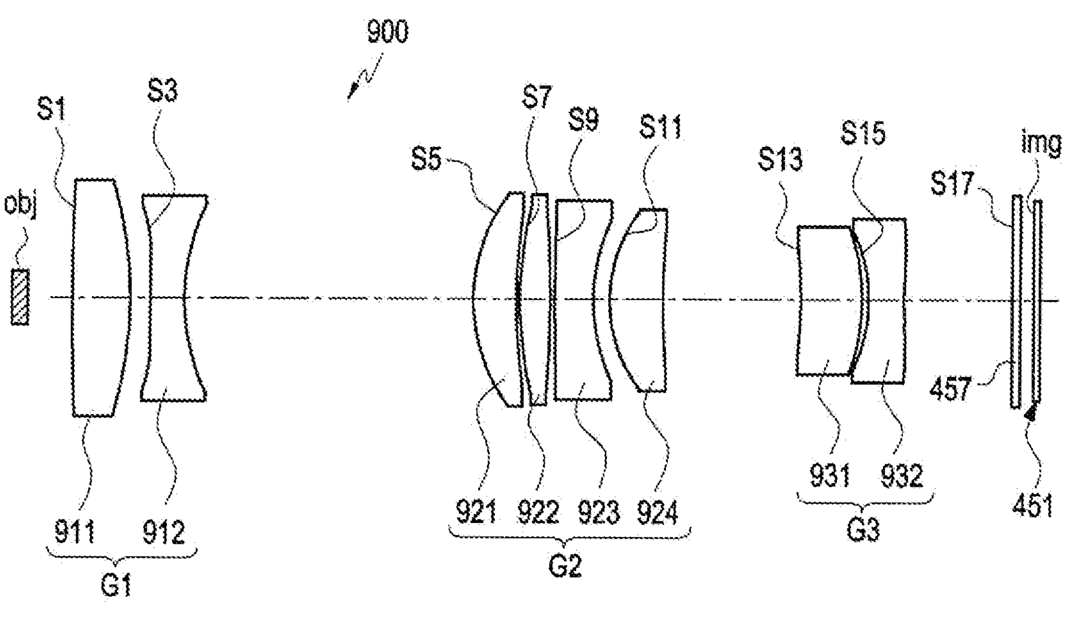
FIG. 23 is a view illustrating a configuration of a lens assembly according to certain embodiments of the disclosure, in which an arrangement of lenses (group) at a wide-angle end is shown.
Figure 24:
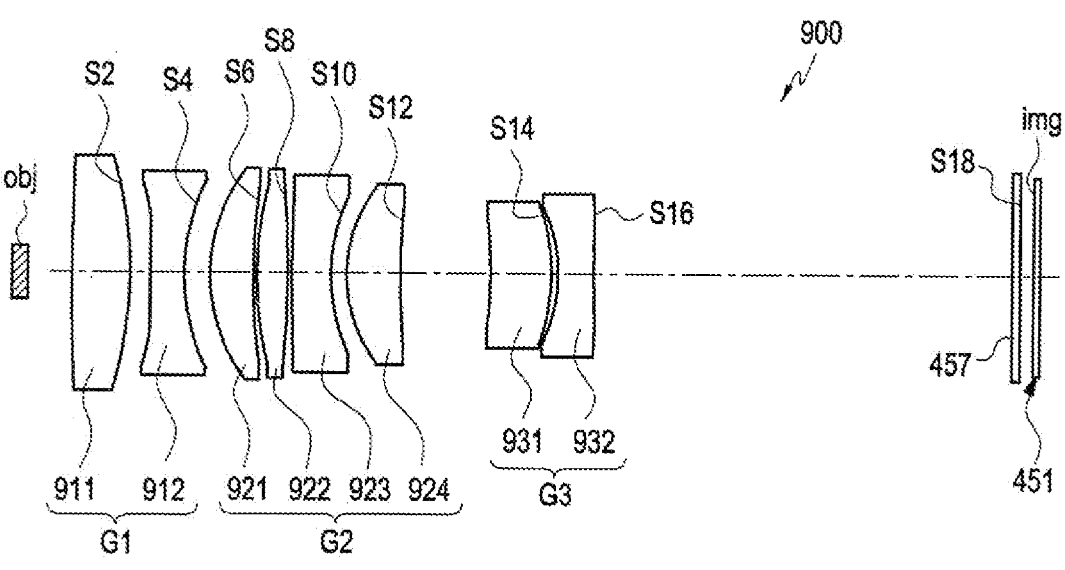
FIG. 24 is a view illustrating the configuration of the lens assembly of FIG. 23, in which an arrangement of lenses (group) at a telephoto end is shown.
Figure 25A:
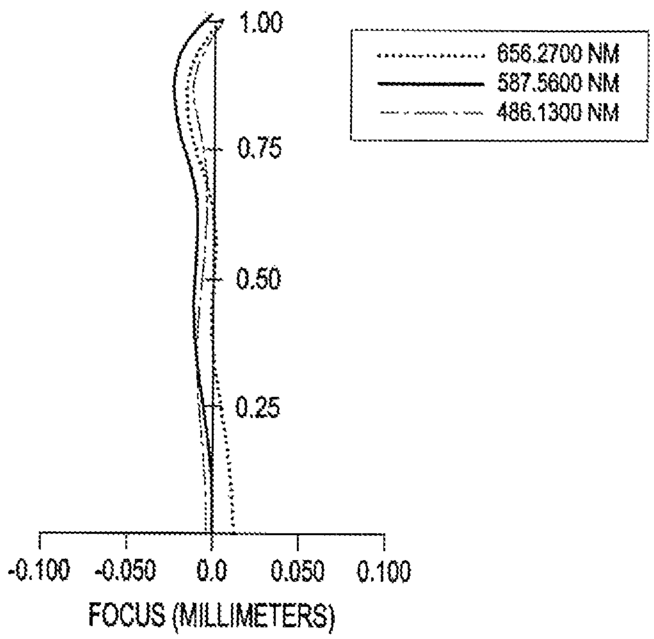
FIGS. 25A to 25C are graphs illustrating spherical aberration, astigmatism, and distortion rate of the lens assembly of FIG. 23.
Figures 25B, 25C:
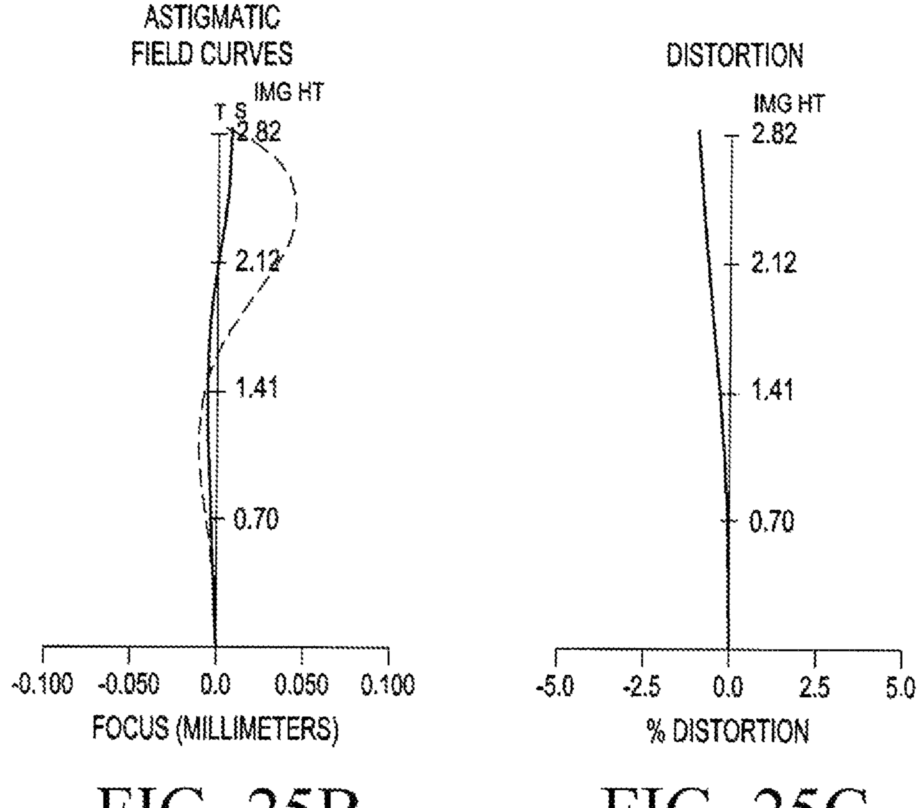
Figure 26A:
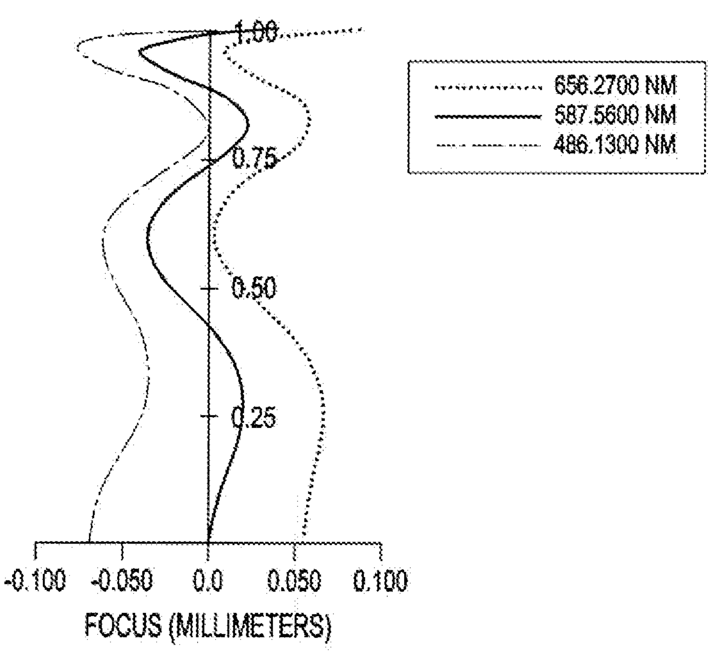
FIGS. 26A to 26C are graphs illustrating spherical aberration, astigmatism, and distortion rate of the lens assembly of FIG. 24.
Figures 26B, 26C:
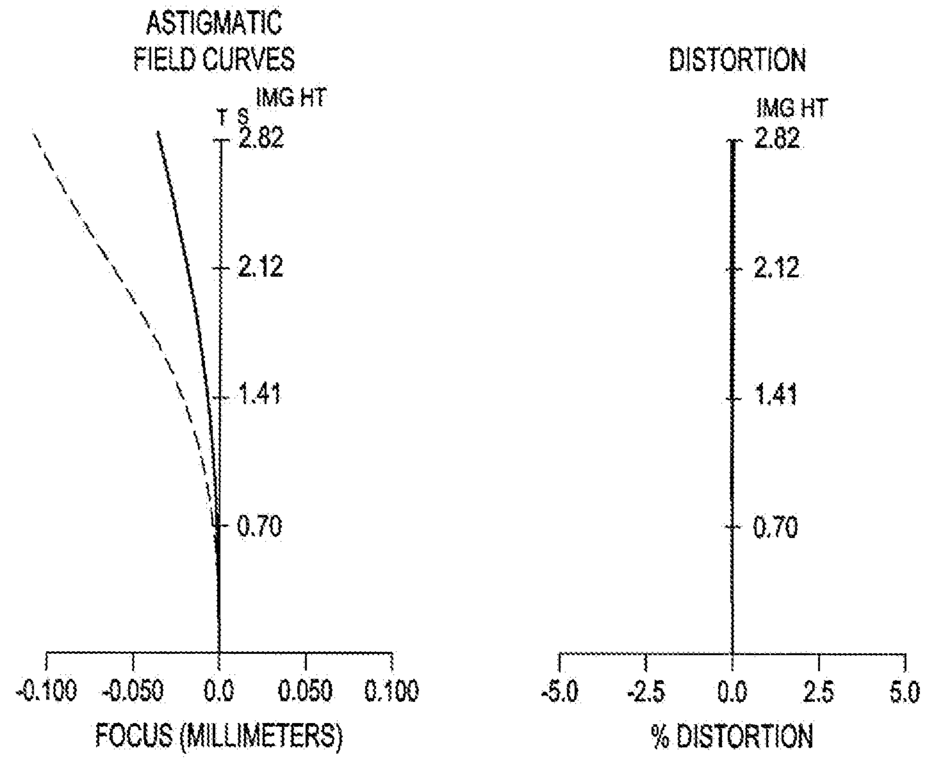

FIG. 23 is a view illustrating a configuration of a lens assembly 900 (e.g., the camera module 405 of FIG. 6) according to certain embodiments of the disclosure, in which a lens (group) arrangement at the wide-angle end is shown. FIG. 24 is a view illustrating the configuration of the lens assembly 900 of FIG. 23, in which an arrangement of lenses (group) at a telephoto end is shown. FIGS. 25A to 25C are graphs illustrating spherical aberration, astigmatism, and distortion rate of the lens assembly 900 of FIG. 23. FIGS. 26A to 26C are graphs illustrating spherical aberration, astigmatism, and distortion rate of the lens assembly 900 of FIG. 24.

Referring to FIGS. 23 to 26C, the lens assembly 900 may meet at least one of the configurations mentioned in the above-described embodiments or conditions suggested through the equations, and may include the first lens group G1, the second lens group G2, the third lens group G3, the infrared cut filter 457, and the image sensor 451 which are sequentially arranged from the object side. The first lens group G1 may include two lenses 911 and 912. The second lens group G2 may include four lenses 921, 922, 923, and 924, and the third lens group G3 may include two lenses 931 and 932.

According to certain embodiments, the lens assembly 900 may meet at least one of the above-described conditions and may have the focal length adjustable within a range of about 11.5 to 27.2 mm, the f-number adjustable in the range of about 2.7 to 4.7, and the angle of view adjustable in the range of about 27.8 to 11.8 degree(s) according to the forward and backward movement of the second lens group G2 and/or the third lens group G3 between the wide-angle end and the telephoto end.

Table 17 and Table 18 below show the lens data of the lens assembly 900 illustrated in FIG. 23 or 24, and Table 19 and Table 20 show the aspheric coefficients of the aspheric lenses among the lenses 911, 912, 921, 922, 923, 924, 931, and 932.

TABLE 17

| lens surface (Surface) | Radius of curvature (radius) | Thickness or air gap (thick or air gap) | Refractive index (nd) | Abbe number (vd) | Focal length (EFL) |
|---|---|---|---|---|---|
| obj | infinity | infinity | | | |
| S1 | 65.935 | 1.65 | 1.648 | 33.84 | 16.1 |
| S2 | −12.233 | 0.57 | | | |
| S3* | 22.004 | 0.94 | 1.535 | 55.75 | −8.3 |
| S4* | 3.627 | D1 | | | |
| S5(stop) | 5.282 | 1.21 | 1.501 | 80.91 | 13.8 |
| S6 | 20.736 | 0.10 | | | |
| S7* | 11.171 | 0.87 | 1.535 | 55.75 | 13.2 |
| S8* | −18.706 | 0.10 | | | |
| S9 | 56.415 | 1.13 | 1.763 | 27.18 | −9.1 |
| S10 | 6.1113402 | 0.44 | | | |
| S11* | 7.388 | 1.57 | 1.535 | 55.75 | 10.9 |
| S12* | −26.046 | D2 | | | |
| S13* | −7.979 | 1.76 | 1.651 | 21.49 | 18.2 |
| S14* | −5.186 | 0.15 | | | |
| S15* | −9.9784 | 1.02 | 1.535 | 55.75 | −8.3 |
| S16* | 8.3322 | D3 | | | |
| S17 | infinity | 0.21 | 1.5168 | 64.2 | |
| S18 | infinity | D4 | | | |
| img | infinity | D5 | | | |

TABLE 18

| Air gap | Wide-angle | Telephoto end |
|---|---|---|
| D1 | 8.30 | 0.80 |
| D2 | 3.92 | 2.62 |
| D3 | 3.07 | 11.87 |

TABLE 19

| lens surface | K | A | B | C | D |
|---|---|---|---|---|---|
| S3 | 10.0000 | −1.2137E−02 | 9.3966E−04 | −3.3855E−05 | 0.0000E+00 |
| S4 | 0.0112 | −1.6797E−02 | 1.2102E−03 | −6.5748E−05 | 0.0000E+00 |
| S7 | 0.0167 | −3.8026E−04 | 2.9866E−05 | −5.8935E−06 | 0.0000E+00 |
| S11 | −2.9181 | 3.2786E−03 | −1.7398E−04 | −2.0040E−06 | 0.0000E+00 |
| S12 | 4.2889 | 5.7411E−03 | −2.1335E−04 | 2.8556E−05 | 0.0000E+00 |
| S12 | −11.0231 | 5.1475E−03 | 3.2374E−04 | 6.5208E−06 | 7.5414E−06 |
| S13 | −27.6526 | 1.4276E−03 | 4.8555E−04 | −2.1005E−05 | 0.0000E+00 |
| S14 | −0.1860 | 5.1002E−03 | −5.6424E−04 | 2.0800E−04 | −2.5360E−05 |
| S15 | 15.1861 | −2.0724E−02 | 2.4597E−03 | −1.2856E−04 | 2.9891E−06 |
| S16 | −28.1844 | −1.5960E−02 | 2.7501E−03 | −3.9649E−04 | 4.1753E−05 |

TABLE 20

| lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | −1.9711E−06 | 0.0000E+00 | 0.0000E+00 | 0.0000E+00 | 0.0000E+00 |

As described above, according to certain embodiments of the disclosure, a lens assembly (e.g., the camera module 405 of FIG. 6 or the lens assembly 500 of FIG. 7) and/or an electronic device (e.g., the electronic devices 101, 200, 300, and 400 of FIGS. 1 to 6) may be easily downsized and may implement a continuous zoom function in the range of about ×2 magnification or about ×3 magnification. For example, the electronic device or processor (e.g., the processor 120 of FIG. 1) may adjust the focal length or perform focus adjustment by moving at least one of a second lens group (e.g., the second lens group G2 of FIG. 6 or 7) or a third lens group (e.g., the third lens group G3 of FIG. 6 or 7) in the direction of the optical axis (e.g., the optical axis O of FIG. 6 or 7) in the zooming operation. According to an embodiment, in the zooming operation, the focal length of the entire lens assembly may be increased by simultaneously moving the second lens group and the third lens group toward the object.

As described above, according to certain embodiments of the disclosure, a lens assembly (e.g., the camera module 405 of FIG. 6 or the lens assembly 500 of FIG. 7) and/or an electronic device (e.g., the electronic devices 101, 200, 300, and 400 of FIGS. 1 to 6) including the same may comprise an image sensor (e.g., the image sensor 451 of FIG. 6 or 7); and first lens group, a second lens group, and a third lens group, wherein the first lens group (e.g., the first lens group G1 of FIG. 6 or 7) has a negative refractive power and is disposed along an optical axis (e.g., the optical axis O of FIG. 6 or 7) direction from the image sensor, and comprises at least two lenses, wherein the second lens group (e.g., the second lens group G2 of FIG. 6 or 7) having a positive refractive power and configured to move along the optical axis direction between the first lens group and the image sensor, the second lens group comprising at least two lenses and wherein the third lens group (e.g., the third lens group G3 of FIG. 6 or 7) has a negative refractive power and is configured to move along the optical axis between the second lens group and the image sensor, the third lens group including at least one lens. The lens assembly is configured to perform zooming, wherein during zooming as at least one of the second lens group and the third lens group moves toward the object side, a focal length of the lens assembly increase. The lens assembly may be configured to meet conditional equation 1 and conditional equation 2.

$$-1.7 \le fG11/fG1 \le -0.6 \quad \text{[conditional equation 1]}$$

$$-3.2 \le \beta G3t/\beta G2t \le -2 \quad \text{[conditional equation 2]}$$

Here, ‘fG11’ may be a focal length of a first lens (e.g., the first lens 453*a* or 511 of FIG. 6 or 7) on the object side among the lenses of the first lens group, ‘fG1’ may be a focal length of the first lens group, ‘βG3t’ may be an imaging magnification of the third lens group at a telephoto end, and ‘βG2t’ may be an imaging magnification of the second lens group at the telephoto end.

According to certain embodiments, the lens assembly may meet conditional equation 3.

$$1.4 \le |fG1|/fw \le 2.5 \quad \text{[conditional equation 3]}$$

Here, ‘fw’ may be a focal length of the lens assembly at a wide-angle end.

According to certain embodiments, the lens assembly may further comprise a reflective member (e.g., the reflective member 455 of FIG. 6, 11, or 15) disposed on the object side of the first lens group. The reflective member may be configured to guide or reflect light incident from an outside to the first lens group.

According to certain embodiments, the second lens group comprises at least one lens having a negative refractive power. The lens assembly may be configured to meet conditional equation 4.

$$-1.4 \leq fG2n/fG2 \leq -0.5 \quad \text{[conditional equation 4]}$$

Here, 'fG2n' may be a focal length of a lens having a negative refractive power in the second lens group, and 'fG2' may be a focal length of the second lens group.

According to certain embodiments, the lens assembly is configured to meet conditional equation 5.

$$1.4 \leq |fG1|/fw \leq 2.5 \quad \text{[conditional equation 5]}$$

Here, 'fw' may be a focal length of the lens assembly at a wide-angle end.

According to certain embodiments, the lens assembly may further comprise a reflective member disposed on the object side of the first lens group. The reflective member may be configured to guide or reflect at least a portion of light incident from an outside to the first lens group.

According to certain embodiments, the lens assembly may be configured so that the focal length of the lens assembly is adjusted as the second lens group moves along the optical axis direction and be configured so that a focus of the lens assembly is adjusted as the third lens group moves along the optical axis direction.

According to certain embodiments, the first lens group may include a first lens disposed first on the object side and having a positive refractive power and at least one second lens disposed between the first lens and the image sensor and having a negative refractive power.

According to certain embodiments, the second lens group may include at least one lens having a positive refractive power and at least one lens having a negative refractive power.

According to certain embodiments, the third lens group may include a lens having a positive refractive power and a lens having a negative refractive power.

According to certain embodiments, at least one of the lenses in the first lens group or at least one of the lenses in the second lens group comprises glass.

According to certain embodiments, the lens assembly may further comprise an infrared cut filter (e.g., the infrared cut filter 457 of FIG. 6 or 7) disposed between the third lens group and the image sensor.

According to certain embodiments of the disclosure, an electronic device (e.g., the electronic devices 101, 200, 300, and 400 of FIGS. 1 to 6) may comprise a processor (e.g., the processor 120 of FIG. 1) and a lens assembly (e.g., the camera module 405 of FIG. 6 or the lens assembly 500 of FIG. 7). The lens assembly may include an image sensor (e.g., the image sensor 451 of FIG. 6 or 7), a first lens group, a second lens group, and a third lens group, wherein the first lens group (e.g., the first lens group G1 of FIG. 6 or 7) has a negative refractive power and includes at least two lenses, the second lens group (e.g., the second lens group G2 of FIG. 6 or 7) has a positive refractive power and is configured to move along the optical axis direction between the first lens group and the image sensor, the second lens group including at least two lenses and the third lens group (e.g., the third lens group G3 of FIG. 6 or 7) is configured to move along the optical axis direction between the second lens group and the image sensor, the third lens group including at least one lens and having a negative refractive power. The processor may be configured to increase a focal length of the lens assembly by moving at least one of the second lens group and the third lens group toward the object side in a zooming operation.

According to certain embodiments, the lens assembly may be configured to meet conditional equation 6 and conditional equation 7.

$$-1.7 \leq fG11/fG1 \leq -0.6 \quad \text{[conditional equation 6]}$$

$$-3.2 \leq \beta G3t/\beta G2t \leq -2 \quad \text{[conditional equation 7]}$$

Here, 'fG11' may be a focal length of a first lens (e.g., the first lens 453*a* or 511 of FIG. 6 or 7) on the object side among the lenses of the first lens group, 'fG1' may be a focal length of the first lens group, 'βG3t' may be an imaging magnification of the third lens group at a telephoto end, and 'βG2t' may be an imaging magnification of the second lens group at the telephoto end.

According to certain embodiments, the second lens group comprises at least one lens having a negative refractive power. The lens assembly may meet conditional equation 8.

$$-1.4 \leq fG2n/fG2 \leq -0.5 \quad \text{[conditional equation 8]}$$

Here, 'fG2n' may be a focal length of a lens having a negative refractive power in the second lens group, and 'fG2' may be a focal length of the second lens group.

According to certain embodiments, the lens assembly meets conditional equation 9.

$$1.4 \leq |fG1|/fw \leq 2.5 \quad \text{[conditional equation 9]}$$

Here, 'fw' may be a focal length of the lens assembly at a wide-angle end.

According to certain embodiments, the lens assembly may further include a reflective member (e.g., the reflective member 455 of FIG. 6, 11, or 15) disposed on the object side of the first lens group. The reflective member may be configured to guide or reflect at least a portion of light incident from an outside to the first lens group.

According to certain embodiments, the processor may be configured to adjust the focal length of the lens assembly by moving the second lens group in the optical axis direction and adjust a focus of the lens assembly by moving the third lens group in the optical axis direction.

According to certain embodiments, the first lens group may comprise a first lens disposed first on the object side and having a positive refractive power and at least one second lens disposed between the first lens and the image sensor and having a negative refractive power.

According to certain embodiments, the lens assembly may further comprise an infrared cut filter (e.g., the infrared cut filter 457 of FIG. 6 or 7) disposed between the third lens group and the image sensor.

While the disclosure has been described and shown in connection with certain embodiments, it should be appreciated that certain embodiments are intended as limiting the invention but as illustrative. It will be apparent to one of ordinary skill in the art that various changes may be made in form and detail without departing from the overall scope of the disclosure, including the appended claims and their equivalents.

What is claimed is:

1. A lens assembly comprising:

an image sensor;

a first lens group;

a second lens group; and a third lens group, wherein the first lens group has a negative refractive power, and comprises at least two lenses disposed along an optical axis from the image sensor, and a first lens on an object side among the at least two lenses of the first lens group having a positive refractive power;

wherein the second lens group has a positive refractive power and is configured to move along the optical axis direction between the first lens group and the image sensor, the second lens group comprising at least two lenses, wherein at least one of the at least two lenses in the second lens group has a negative refractive power;

wherein the third lens group has a negative refractive power and is configured to move back and forth along the optical axis direction between the second lens group and the image sensor, the third lens group comprises a 3-1st lens having a positive refractive power and a 3-2nd lens having a negative refractive power and disposed between the 3-1st lens and the image sensor, and an air gap between the $3\text{-}1^{st}$ lens and the $3\text{-}2^{nd}$ lens, wherein the lens assembly is configured to perform zooming, and wherein during zooming, as at least one of the second lens group and the third lens group moves toward an object side while the first lens group is static, a focal length of the lens assembly increases, and wherein the lens assembly meets conditional equation 1 through conditional equation 4, wherein $$-1.7 \leq fG11/fG1 \leq -0.6 \quad \text{[conditional equation 1]}$$

$$-3.2 \leq \beta G3t/\beta G2t \leq -2 \quad \text{[conditional equation 2]}$$

$$1.4 \leq |fG1|/fw \leq 2.5 \quad \text{[conditional equation 3]}$$

$$-1.4 \leq fG2n/fG2 \leq -0.5 \quad \text{[conditional equation 4]}$$

wherein 'fG11' is a focal length of a first lens on the object side among lenses of the first lens group, 'fG1' is a focal length of the first lens group, 'βG3t' is an imaging magnification of the third lens group at a telephoto end, 'βG2t' is an imaging magnification of the second lens group at the telephoto end, 'fw' is a focal length of the lens assembly at a wide-angle end, 'fG2n' is a focal length of the at least one lens having a negative refractive power in the second lens group, and 'fG2' is a focal length of the second lens group.

2. The lens assembly of claim 1, further comprising a reflective member disposed on the object side of the first lens group, wherein the reflective member is configured to guide or reflect light incident from an outside to the first lens group.

3. The lens assembly of claim 1, further comprising a reflective member disposed on the object side of the first lens group, wherein the reflective member is configured to guide or reflect at least a portion of light incident from an outside to the first lens group.

4. The lens assembly of claim 1, wherein the lens assembly is configured so that the focal length of the lens assembly is adjusted as the second lens group moves along the optical axis direction and is configured so that a focus of the lens assembly is adjusted as the third lens group moves along the optical axis direction.

5. The lens assembly of claim 1, wherein the first lens group further comprises at least one second lens disposed between the first lens and the image sensor and having a negative refractive power.

6. The lens assembly of claim 1, wherein the second lens group includes at least one lens having a positive refractive power and at least one lens having a negative refractive power.

7. The lens assembly of claim 1, wherein at least one of the lenses in the first lens group or at least one of the lenses in the second lens group comprises glass.

8. The lens assembly of claim 1, further comprising an infrared cut filter disposed between the third lens group and the image sensor.

9. The lens assembly of claim 1 wherein a focal length of the last lens in the first lens group is between −12 mm and −8 mm and a focal length of the last lens in the second lens group is between 9.5 mm and 11 mm.

10. An electronic device comprising:

a processor; and a lens assembly, wherein the lens assembly includes, an image sensor;

a first lens group;

a second lens group; and a third lens group, wherein the first lens group has a negative refractive power and includes at least two lenses disposed along an optical axis from the image sensor, and a first lens on an object side among the at least two lenses of the first lens group having a positive refractive power;

wherein the second lens group has a positive refractive power and is configured to move along an optical axis direction between the first lens group and the image sensor, the second lens group including at least two lenses, wherein at least one lens of the at least two lenses of the second lens group has a negative refractive power; and wherein the third lens group has a negative refractive power and is configured to move back and forth along the optical axis direction between the second lens group and the image sensor, the third lens group comprises a 3-1 st lens having a positive refractive power and a 3-2nd lens having a negative refractive power and disposed between the 3-1st lens and the image sensor, and the $3\text{-}1^{st}$ lens has a surface facing the image sensor with a first radius of curvature, and wherein the $3\text{-}2^{nd}$ lens has a surface facing the object side having a second radius of curvature that is different from the first radius of curvature, wherein the processor is configured to increase a focal length of the lens assembly by moving at least one of the second lens group and the third lens group toward an object side in a zooming operation while the first lens group is static, wherein the lens assembly meets conditional equation 6 through conditional equation 9, wherein $$-1.7 \leq fG11/fG1 \leq -0.6$$ [conditional equation 6]

$$-3.2 \leq \beta G3t/\beta G2t \leq -2$$ [conditional equation 7]

$$-1.4 \leq fG2n/fG2 \leq -0.5$$ [conditional equation 8]

$$1.4 \leq |fG1|/fw \leq 2.5,$$ [conditional equation 9]

and wherein 'fG11' is a focal length of a first lens on the object side among lenses of the first lens group, 'fG1' is a focal length of the first lens group, 'βG3t' is an imaging magnification of the third lens group at a telephoto end, 'βG2t' is an imaging magnification of the second lens group at the telephoto end, 'fG2n' is a focal length of a lens having a negative refractive power in the second lens group, and 'fG2' is a focal length of the second lens group, and 'fw' is a focal length of the lens assembly at a wide-angle end.

11. The electronic device of claim 10, wherein the lens assembly further includes a reflective member disposed on the object side of the first lens group, wherein the reflective member is configured to guide or reflect at least a portion of light incident from an outside to the first lens group.

12. The electronic device of claim 10, wherein the processor is configured to;

adjust the focal length of the lens assembly by moving the second lens group in the optical axis direction and adjust a focus of the lens assembly by moving the third lens group in the optical axis direction.

13. The electronic device of claim 10, wherein the first lens group further comprises at least one second lens disposed between the first lens and the image sensor and having a negative refractive power.

14. The electronic device of claim 10, wherein the lens assembly further comprises an infrared cut filter disposed between the third lens group and the image sensor.

* * * * *